United States Patent [19]

Iida et al.

[11] Patent Number: 4,789,954

[45] Date of Patent: Dec. 6, 1988

[54] METHOD FOR GENERATING QUADRATIC CURVE SIGNAL

[75] Inventors: Hideaki Iida, Fujisawa; Johji Mamiya, Kunitachi; Yutaka Morimoto, Fujisawa, all of Japan

[73] Assignee: International Business Machines Corporation, Armonk, N.Y.

[21] Appl. No.: 862,901

[22] Filed: May 13, 1986

[30] Foreign Application Priority Data

May 14, 1985 [JP] Japan ................................ 60/100672

[51] Int. Cl.[4] ................................................ G06F 1/02

[52] U.S. Cl. ...................................... 364/720; 364/718

[58] Field of Search ................................. 364/718–721

[56] References Cited

U.S. PATENT DOCUMENTS

| | | | |
|---|---|---|---|
| 3,917,932 | 11/1975 | Saita et al. | 364/718 |
| 4,272,808 | 6/1981 | Hartwig | 364/720 |
| 4,484,298 | 11/1984 | Inoue et al. | 364/720 |
| 4,692,887 | 9/1987 | Hashidate | 364/720 |

OTHER PUBLICATIONS

Cederberg, "*A New Method for Vector Generation*", Computer Graphics and Image Processing, 1979, pp. 183–195.

Suenaga et al., "*A High-Speed Algorithm for the Generation of Straight Lines and Circular Arcs*", *IEEE Trans. on Comp., vol. c28, No. 10, Oct. 79, pp. 728–738.*

Jordan, Jr. et al., "*An Improved Algorithm for the Generation of Nonparametric Curves*", IEEE Trans. on Comp., vol. C22, No. 12, Dec. 1973, pp. 1052–1060.

Danielsson, "*Incremental Curve Generation*", IEEE Trans. on Comp., vol. C19, No. 9, Sep. 1970, pp. 783–793.

*Primary Examiner*—Gary V. Harkcom
*Assistant Examiner*—Long T. Nguyen
*Attorney, Agent, or Firm*—George E. Clark; Joseph J. Connerton

[57] ABSTRACT

Assuming that a given equation representing a quadratic curve is:

$$F(x, y)=ax^2+bxy+cy^2+dx+ey+f=0,$$

the method for generating quadratic curve signals repeatedly selects a point close to $F(x, y)=0$ in only one of either the region of $F(x,y)\geqq 0$ or the region of $F(x,y)<0$. This method allows to generate quadratic curve signals by using only a few parameters and without using complicated calculations. A hardware implementation is also disclosed.

7 Claims, 16 Drawing Sheets

FLOWCHART OF METHOD FOR GENERATING QUADRATIC CURVE SIGNAL

PRINCIPLES FOR GENERATING QUADRATIC CURVE SIGNAL

PRINCIPLES FOR GENERATING QUADRATIC CURVE SIGNAL

FIG. 4 ILLUSTRATION OF EIGHT OCTANTS

ILLUSTRATION OF α AND β CHANGES

DIAGRAM SHOWING A SERIES OF DOTS APPROXIMATING A CIRCLE

DIAGRAM SHOWING A SERIES OF DOTS APPROXIMATING A CIRCLE

DIAGRAM SHOWING STEPS TO DISPLAY A SERIES OF DOTS APPROXIMATING A CIRCLE

DIAGRAM SHOWING STEPS TO DISPLAY A SERIES OF DOTS APPROXIMATING AN ELLIPSE

DIAGRAM SHOWING STEPS TO DISPLAY A SERIES OF DOTS APPROXIMATING AN ELLIPSE

DIAGRAM SHOWING STEPS TO DISPLAY A SERIES OF DOTS APPROXIMATING A PARABOLA

FIG. 12 BLOCK DIAGRAM OF APPARATUS FOR GENERATING QUADRATIC CURVE SIGNAL
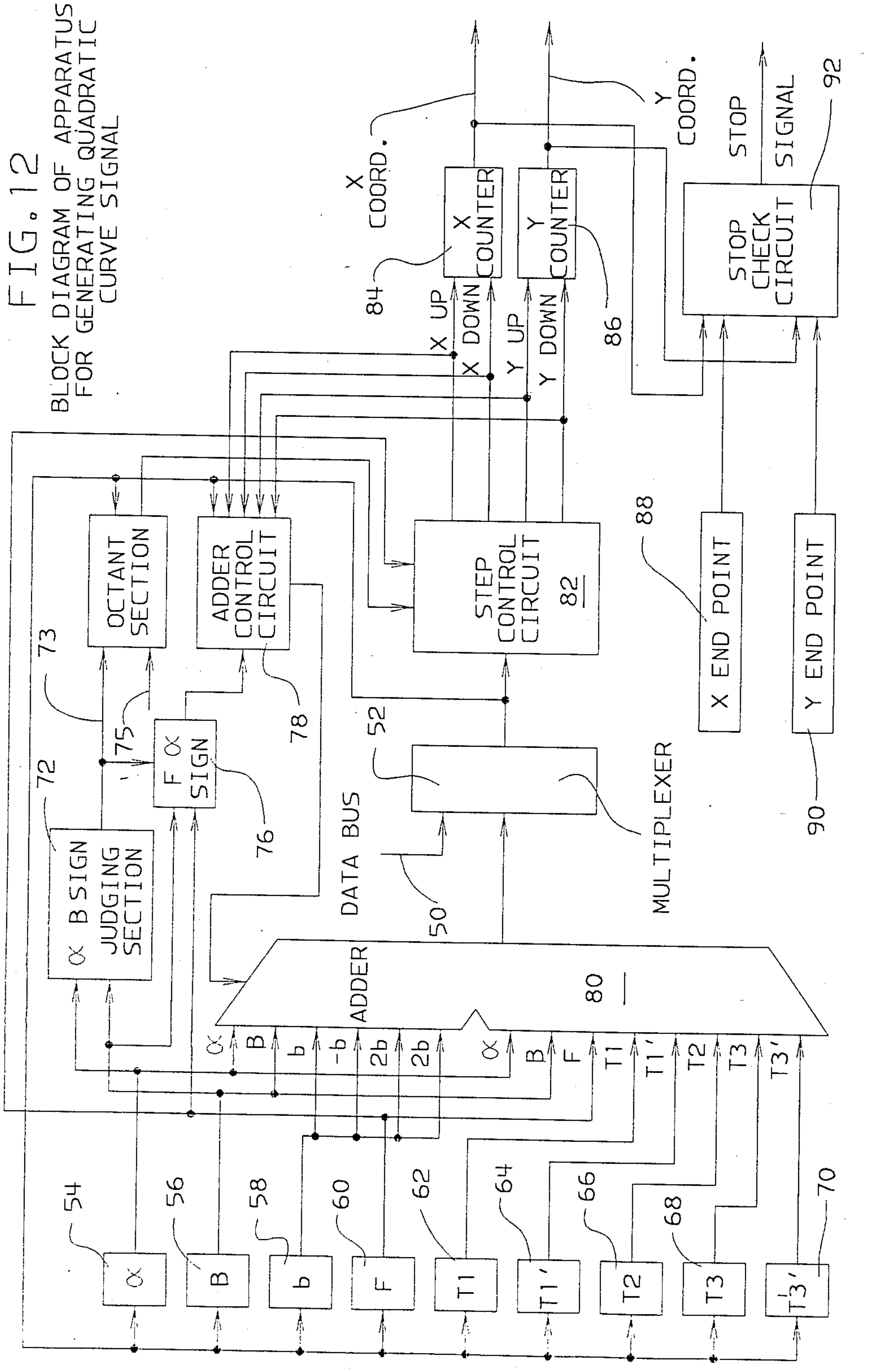

METHOD FOR GENERATING QUADRATIC CURVE SIGNAL

BACKGROUND OF THE INVENTION

1. Field of the Invention

This invention relates to a method for generating signals representing a quadratic curve such as a circle, an ellipse or a parabola, and more particularly to a method for generating quadratic curve signals best suited for use in a CRT display unit or a plotter.

2. Description of Prior Art

Known as a conventional method for generating signals representing a quadratic curve by repeating steps that select a new point from among eight points (x+1, y+1), (x+1, y), (x+1, y−1), (x, y−1), (x−1, y−1), (x−1, y), (x−1, y+1) and (x, y+1) adjacent to a current point (x, y) in a Cartesian coordinates system, is a method disclosed by a paper entitled "Algorithm for drawing ellipses or hyperbolae with a digital plotter" by M. L. V. Pitteway, Computer Journal, Vol. 10, November 1967, pp. 282–289.

This method first selects one octant from among the first octant in which point (x+1, y+1) or (x+1, y) can be selected, the second octant in which point (x+1, y) or (x+1, y−1) can be selected, the third octant in which point (x+1, y−1) or (x, y−1) can be selected, the fourth octant in which point (x, y−1) or (x−1, y−1) can be selected, the fifth octant in which point (x−1, y−1) or (x−1, y) can be selected, the sixth octant in which point (x−1, y) or (x−1, y+1) can be selected, the seventh octant in which point (x−1, y+1) or (x, y+1) can be selected, and the eighth octant in which point (x, y+1) or (x+1, y+1) can be selected. Then, by assuming that selectable points in the selected octant are ($X_1$, $Y_1$) and ($X_2$, $Y_2$) (e.g., $X_1=x+1$, $Y_1=y+1$, $X_2=x+1$ and $Y_2=y$ in the first octant), that the equation of the quadratic curve is $$F(x, y)=ax^2+bxy+cy^2+dx+ey+f=0,$$

and that $X_3=(X_1+X_2)/2$ and $Y_3=(Y_1+Y_2)/2$, either ($X_1$, $Y_1$) or ($X_2$, $Y_2$) is selected according to the sign of $D(x,y)=F(X_3, Y_3)$. Consequently, the next point is selected whether it be in the region of F (x,y)≧0 or in the region of F (x,y)<0.

The method described in the above paper requires many parameters, complicated operations, and many operations for changing of parameters when changing the octant. And, it has a problem that it is difficult to be realized on hardware.

SUMMARY OF THE INVENTION

An object of this invention is to provide a method for generating quadratic curve signals which requires relatively few parameters, can generate signals representing a quadratic curve with only simple operations, and can be easily realized in hardware.

To attain the above objects, according to this invention, signals representing a line approximating a quadratic curve F (x, y)=0 are generated by repeatingly selecting a new point close to F (x,y)=0 from points in only one of either the region of F (x,y)≧0 or the region of F (x,y)<0.

If the point to be selected is limited to only in the positive or only in the negative region of F (x,y), as described above, the next point is a point which does not change the sign of F (x,y) but if possible it reduces the absolute value of F (x,y). So the selection of a point is performed only by determining the sign.

For example, it is assumed that two candidate points ($X_1$, $Y_1$) and ($X_2$, $Y_2$) are selected in the octant selection step, from eight points around the current point. (($X_0$, $Y_0$) is the current point.) Then let $$F(X_1, Y_1)-F(X_0, Y_0)=\alpha$$

(the accrual of F when point ($X_1$, $Y_1$) is selected), and $$F(X_2, Y_2)-F(X_0, Y_0)=\beta$$

(the accrual of F when point ($X_2$, $Y_2$) is selected).

Then, if points only in the region of F (x, y)≧0 are to be selected, the following steps are sufficient to decide the choice of the next point:

(1) Check the sign of $\alpha$ or $\beta$,
(2) Check the sign of F ($X_2$, $Y_2$) if $\alpha \geqq 0 (\beta<0)$,
(3) Check the sign of F ($X_1$, $Y_1$) if $\alpha<0 (\beta \geqq 0)$,
(4) Select ($X_2$, $Y_2$) if F ($X_2$, $Y_2$)≧0 or F ($X_1$, $Y_1$)<0,
(5) Select ($X_1$, $Y_1$) if F ($X_2$, $Y_2$)<0 or F ($X_1$, $Y_1$)≧0.

If points only in the region of F (x, y)<0 are to be selected, the following steps are sufficient to decide the selection of the next point:

(1) Check the sign of $\alpha$ or $\beta$,
(2) Check the sign of F ($X_1$, $Y_1$) if $\alpha \geqq 0$ ($\beta<0$),
(3) Check the sign of F ($X_2$, $Y_2$) if $\alpha<0$ ($\beta \geqq 0$),
(4) Select ($X_1$, $Y_1$) if F ($X_2$, $Y_2$)≧0 or F ($X_1$, $Y_1$)<0,
(5) Select ($X_2$, $Y_2$) if F ($X_2$, $Y_2$)<0 or F ($X_1$, $Y_1$)≧0.

It should be noted that in the above steps only signs are checked. Thus, it is possible to provide symmetry to the flow of operations, which allows an easy realization with hardware.

BRIEF DESCRIPTION OF THE DRAWINGS

FIG. 12 is a block diagram showing one exemplary configuration of an apparatus used for performing the method of FIG. 1.

DESCRIPTION OF THE PREFERRED EMBODIMENT

Figure 1:
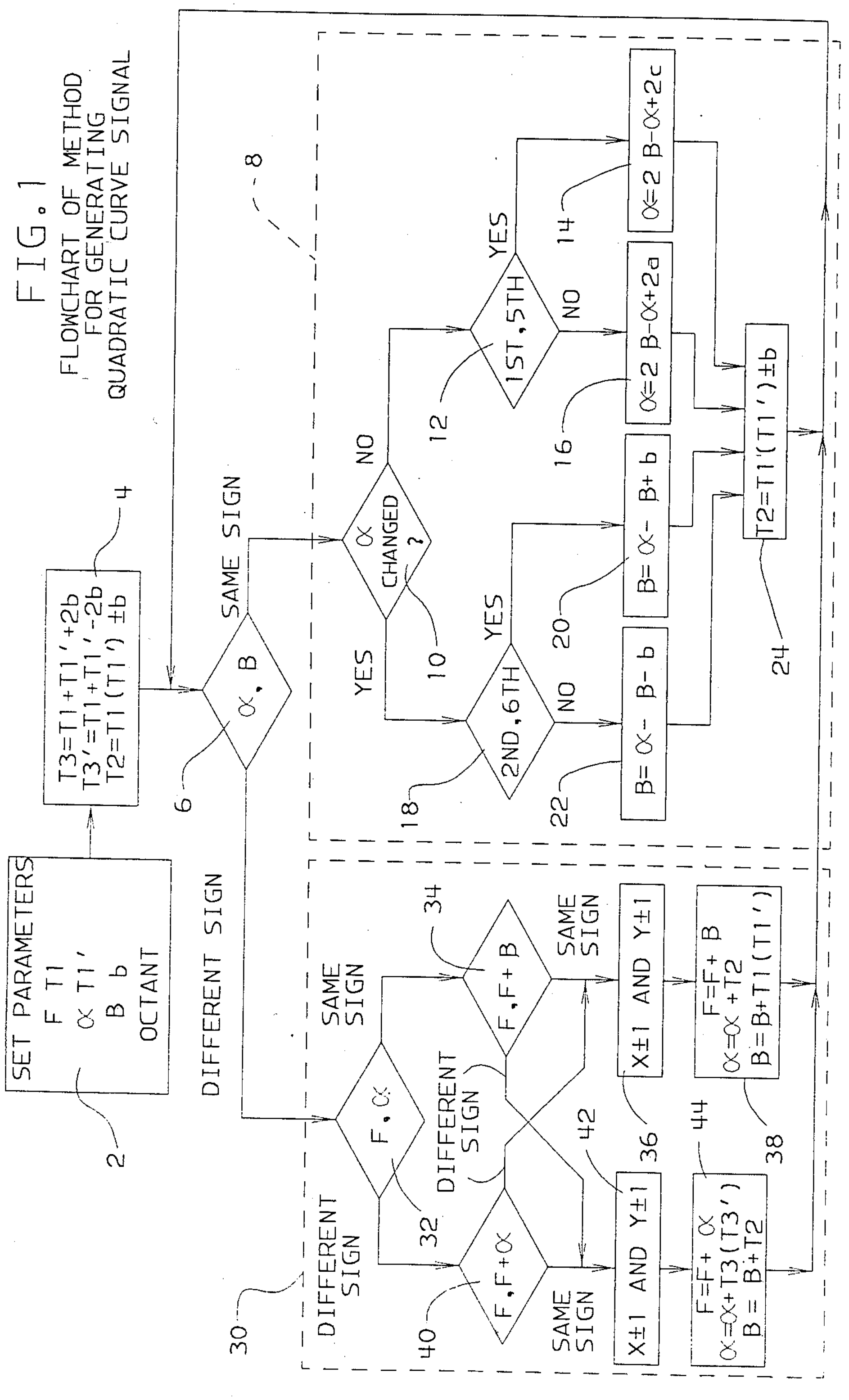
FIG. 1 is a flowchart showing one embodiment of a method for generating quadratic signals according to the invention.

FIG. 1 is a flowchart showing an embodiment of the method for generating quadratic curve signals according to the invention. Prior to the description the embodiment of the invention shown in FIG. 1, basic principles of the invention will be described by referring to FIGS. 2 and 3.

Figure 2:
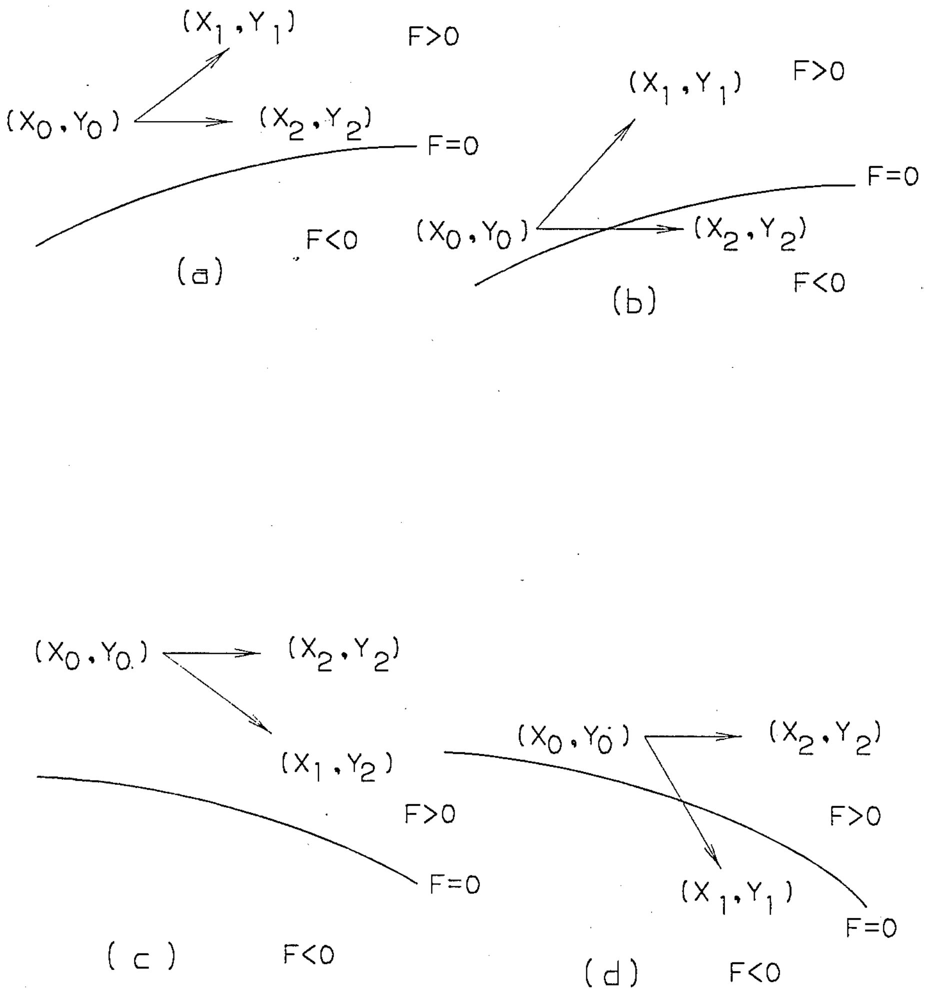
FIGS. 2(*a*)-(*d*) and 3(*a*)-(*d*) are diagrams illustrating the basic principle of the invention.

FIG. 2 shows the method for selecting the next point in the region of F (x,y)≧0. In the figure, ($X_0$, $Y_0$) indicates the current point, ($X_1$, $Y_1$) and ($X_2$, $Y_2$) the two candidates for the next point. In the case of FIG. 2(*a*), because both ($X_1$, $Y_1$) and ($X_2$, $Y_2$) are in the region of F (x, y)<0, ($X_2$, $Y_2$) which is closer to F (x, y)=0 is selected. In the case of FIG. 2(*b*), although ($X_2$, $Y_2$) is closer to F (x,y)=0 than ($X_1$, $Y_1$), ($X_1$, $Y_1$) is selected because ($X_2$, $Y_2$) is in the region of F (x, y)<0. In the case of FIG. 2(*c*), because both ($X_1$, $Y_1$) and ($X_2$, $Y_2$) are in the region of F (x, y)<0, ($X_1$, $Y_1$) being closer to F (x, y)=0 is selected. In the case of FIG. 2(*d*), although ($X_1$, $Y_1$) is closer to F (x, y)=0 than ($X_2$, $Y_2$), ($X_2$, $Y_2$) is selected because ($X_1$, $Y_1$) is in the region of F (x, y)<0.

Figure 3:
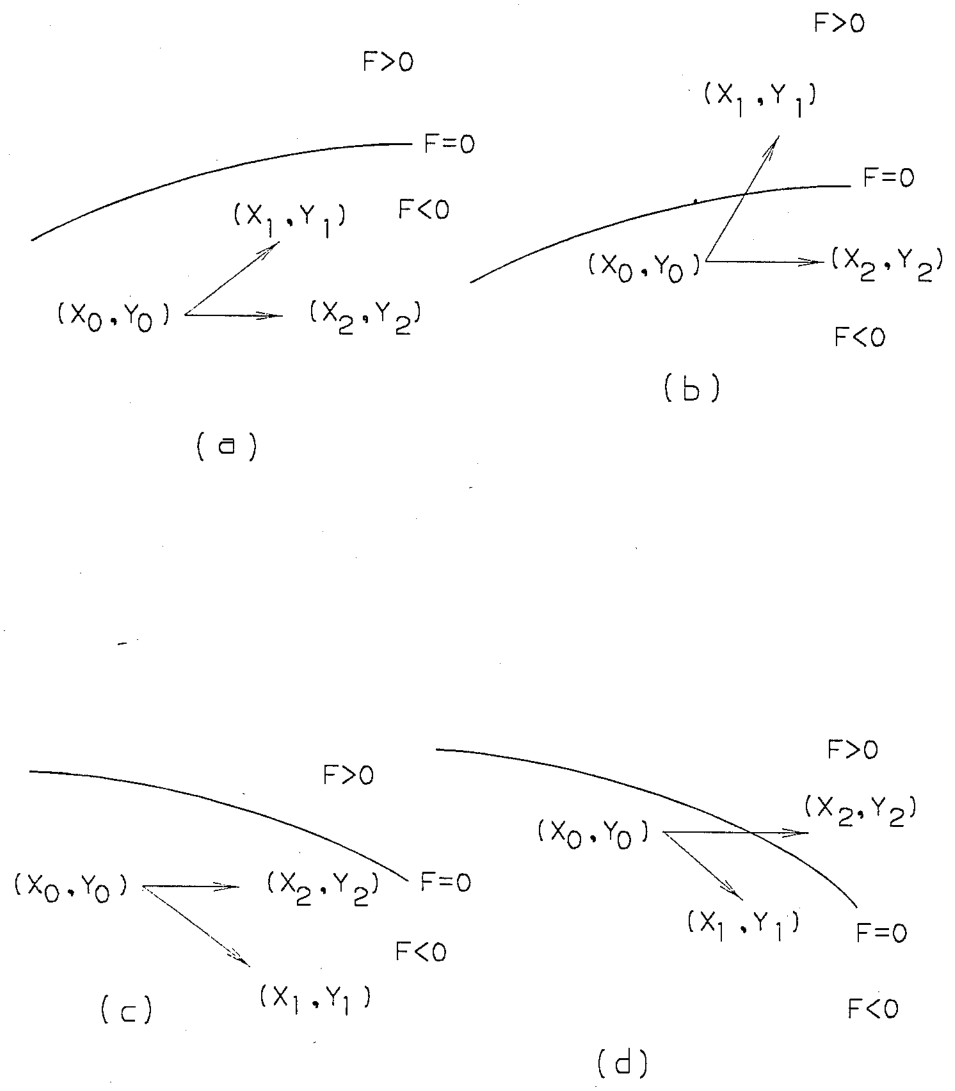

FIG. 3 shows the method for selecting the next point in the region of F (x, y)<0. In the case of FIG. 3(*a*), because both ($X_1$, $Y_1$) and ($X_2$, $Y_2$) are in the region of F (x, y)<0, ($X_1$, $Y_1$) being closer to F (x, y)=0 is selected. In the case of FIG. 3(*b*), although ($X_1$, $Y_1$) is closer to F (x, y)=0 than ($X_2$, $Y_2$), ($X_2$, $Y_2$) is selected because ($X_1$, $Y_1$) is in the region of F (x, y)<0. In the case of FIG. 3(*c*), because both ($X_1$, $Y_1$) and ($X_2$, $Y_2$) are in the region of F (x, y)<0, ($X_2$, $Y_2$) which is closer to F (x, y)=0 is selected. In the case of FIG. 3(*d*), although ($X_2$, $Y_2$) is closer to F (x, y)=0 than ($X_1$, $Y_1$), ($X_1$, $Y_1$) is selected because ($X_2$, $Y_2$) is in the region of F (x, y)<0.

In the embodiment shown in FIG. 1, the following parameters are used:

Decision parameter: F $(=ax^2+bxy+cy^2+dx+ey+f)$

Direction parameters: α, β (dependent of x, y, a, b, c, d, e, octant)

Shape parameters: a, b, c (coefficients of $x^2$, xy and $y^2$ in the quadratic equation)

Figure 4:
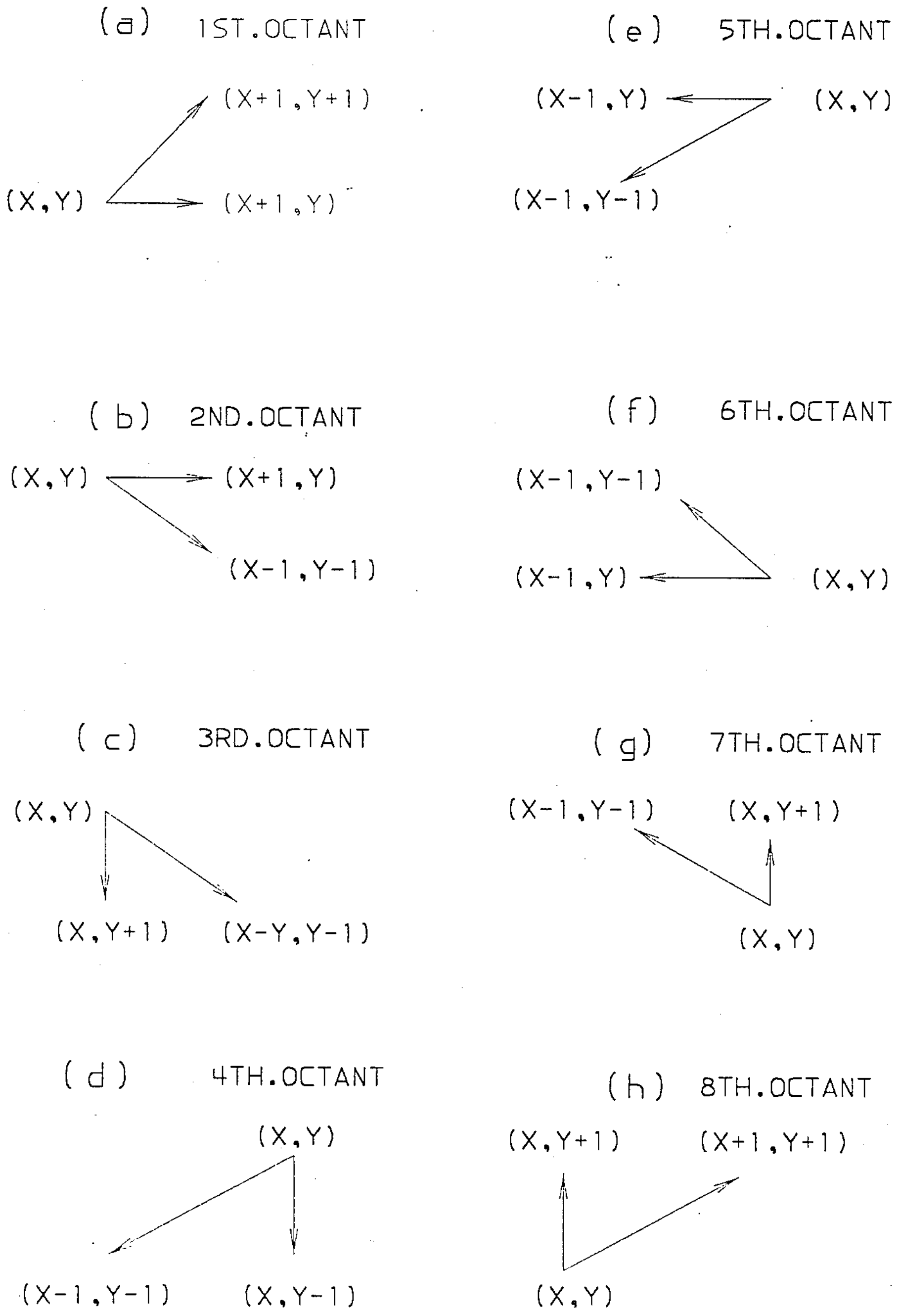
FIGS. 4(*a*)-(*h*), are diagrams illustrating eight octants.

Deviation parameters: T1, T2, T3 (dependent of a, b, c, octant)

α and β depend on the octant. There are eight octants. FIG. 4(*a*) shows the first octant in which a point (x+1, y+1) or (x+1, y) can be selected as the next point to the current point (x, y), FIG. 4(*b*) shows the second octant in which a point (x+1, y) or (x+1, y−1) can be selected as the next point, FIG. 4(*c*) shows the third octant in which a point (x+1, y−1) or (x, y−1) can be selected as the next point, FIG. 4(*d*) shows the fourth octant in which a point (x, y−1) or (x−1, y−1) can be selected as the next point, FIG. 4(*e*) shows the fifth octant in which a point (x−1, y−1) or (x−1, y) can be selected as the next point, FIG. 4(*f*) shows the sixth octant in which a point (x−1, y) or (x−1, y+1) can be selected as the next point, FIG. 4(*g*) shows the seventh octant in which a point (x−1, y+1) or (x, y+1) can be selected as the next point, FIG. 4(*h*) shows the eighth octant in which a point (x, y+1) or (x+1, y+1) can be selected as the next point.

In the first octant, α and β are:

$$\alpha=F(x+1, y+1)-F(x, y)$$

$$\beta=F(x+1, y)-F(x, y)$$

In the second octant:

$$\alpha=F(x+1, y-1)-F(x, y)$$

$$\beta=F(x+1, y)-F(x, y)$$

In the third octant:

$$\alpha=F(x+1, y-1)-F(x, y)$$

$$\beta=F(x, y-1)-F(x, y)$$

In the fourth octant:

$$\alpha=F(x-1, y-1)-F(x, y)$$

$$\beta=F(x, y-1)-F(x, y)$$

In the fifth octant:

$$\alpha=F(x-1; y-1)-F(x, y)$$

$$\beta=F(x-1, y)-F(x, y)$$

In the sixth octant:

$$\alpha=F(x-1, y+1)-F(x, y)$$

$$\beta=F(x-1, y)-F(x, y)$$

In the seventh octant:

$$\alpha=F(x-1, y+1)-F(x, y)$$

$$\beta=F(x, y+1)-F(x, y)$$

In the eighth octant:

$$\alpha=F(x+1, y+1)-F(x, y)$$

$$\beta=F(x, y+1)-F(x, y)$$

It should be noted that, by these definitions, α changes while β does not, in a transition between the first and second octants, or between the third and fourth octants, or the fifth and sixth, or the seventh and eighth octants. Similarly, β changes but α does not, in any transition between the second and third, or the fourth and fifth, the sixth and seventh, or the eighth and first octants. Thus, in any transition between adjacent octants, only one of the parameters α and β will change in value and must be updated.

As illustrated later, T1 is a parameter which must be added to β after selecting a point that displaces by (+1) or (−1) along either X or Y direction from the current point (x, y). T1 has the following values:

In the first octant, $2a(=\beta(x+1, y)-\beta(x, y))$,
In the second octant, $2a(=\beta(x+1, y)-\beta(x, y))$,
In the third octant, $2c(=\beta(x, y-1)-\beta(x, y))$,
In the fourth octant, $2c(=\beta(x, y-1)-\beta(x, y))$,
In the fifth octant, $2a(=\beta(x, y-1y)-\beta(x, y))$,
In the sixth octant, $2a(=\beta(x-1, y)-\beta(x, y))$,
In the seventh octant, $2c(=\beta x, y+1)-\beta(x, y))$,
In the eighth octant, $2c(=\beta(x, y+1)-\beta(x, y))$.

Thus, T1 is 2*a* in the first, second, fifth and sixth octant, and is 2*c* in the third, fourth, seventh and eighth octants. In other words, T1 has only two values for all octants. Therefore, in the following, T1 is referred as T1 (=2*a*) for the first, second, fifth and sixth octant, and T1′ (=2c) in the third, fourth, seventh and eighth octants.

As illustrated later, T2 is a parameter which must be added to α after selecting a point that displaces by (+1) or (−1) along either X or Y direction from the current point (x, y), and must be added to β after selecting a point that displaces by (+1) or (−1) in X direction and by (+1) or (−1) in Y direction, from the current point (x, y). T2 has the following values:

In the first octant, $2a+b(=\alpha(x+1,\ y)-\alpha(x,\ y)=\beta(x+1,\ y+1)-\beta(x,\ y))$, In the second octant, $2a-b(=\alpha(x+1,\ y)-\alpha(x,\ y)=\beta(x+1,\ y-1)-\beta(x,\ y))$, In the third octant, $2c=b(=\alpha(x,\ y-1)-\alpha(x,\ y)=\beta(x+1,\ y-1)-\beta(x,\ y))$, In the fourth octant, $2c+b(=\alpha(x,\ y-1)-\alpha(x,\ y)=\beta(x-1,\ y-1)-\beta(x,\ y))$, In the fifth octant, $2a+b(=\alpha(x-1,\ y)-\alpha(x,\ y)=\beta(x-1,\ y-1)-\beta(x,\ y))$, In the sixth octant, $2a-b(=\alpha(x-1,\ y)-\alpha(x,\ y)=\beta(x-1,\ y+1)-\beta(x,\ y))$, In the seventh octant, $2c-b(=\alpha(x,\ y+1)-\alpha(x,\ y)=\beta(x-1,\ y+1)-\beta(x,\ y))$, In the eighth octant, $2c+b(=\alpha(x,\ y+1)-\alpha(x,\ y)=\beta(x+1,\ y+1)-\beta(x,\ y))$.

As illustrated later, T3 is a parameter which must be added to α after selecting a point that displaces by (+1) or (−1) in X direction and by (30 1) or (−1) in Y direction, from the current point (x, y). T3 has the following values:

In the first octant, $2a+2c+2b(=\alpha(x+1, y+1)-\alpha(x, y))$

In the second octant, $2a+2c-2b(=\alpha(x+1, y-1)-\alpha(x, y))$

In the third octant, $2a+2c-2b(=\alpha(x+1, y-1)-\alpha(x, y))$

In the fourth octant, $2a+2c-2b(=\alpha(x+1, y-1)-\alpha(x, y))$

In the fifth octant, $2a+2c+2b(=\alpha(x-1, y-1)-\alpha(x, y))$

In the sixth octant, $2a+2c-2b\ (=\alpha(x-1, y+1)-(x, y))$

In the seventh octant, $2a+2c-2b\ (=\alpha(x-1, y+1)-\alpha(x, y))$

In the eighth octant, $2a+2c+2b(=\alpha(x+1, y+1)-\alpha(x, y))$

Thus, T3 is $2a+2c+2b$ in the first, fourth, fifth and eighth octants, and is $2a+2c-2b$ in the second, third, sixth and seventh octants. In other words, T3 has only two values for all octants. Therefore, in the following, T3 is referred to as T3 ($=2a+2c+2b$) for the first, fourth, fifth and eighth octants, and T3′ ($=2a+2c-2b$) in the second, third, sixth and seventh octants.

Table 1 below shows the values of α, β, T1 (T1′), T2 and T3 (T3′) in the eight octants.

In Table 1, the equations in the change column (either the α or β column) are:

$$\alpha=2\beta-\alpha+2c$$

$$\alpha=2\beta-\alpha+2a$$

$$\beta=\alpha-\beta+b$$

$$\beta=\alpha-\beta-b$$

These are equations for finding α and β for the next octant by using α and β for the current octant, when changing the octant. Three digits in parentheses in the octant column are codes indicating each octant.

It should be noted that the above equations, for finding α and β for the next octant, apply for transitions between two adjacent octants in either direction. This is because these equations express a symmetrical function, the sum, of the old and new values of the changing parameter (α or β) in terms of other parameters that do not change in the subject transition, as is easily seen.

TABLE 1

| Octant | α | β | T1 | T2 | T3 |
|---|---|---|---|---|---|
| First<br>(111) | 2ax + bx + by + 2cy +<br>a + b + c + d + e | 2ax + by + a + d | 2a | 2a + b | 2a + 2c + 2b |
| Change | α 32 2 β − α + 2c | | | | |
| Second<br>(110) | 2ax − bx + by − 2cy +<br>a − b + c + d + 3 | 2ax + by + a + d | 2a | 2a − b | 2a + 2c − 2b<br>(T3′) |
| Change | | β = α + b | | | |
| Third<br>(010) | 2ax − bx + by − 2cy +<br>a − b + c + d + e | −bx − 2cy + c − e | 2c<br>(T1′) | 2c − b | 2a + 2c − 2b<br>(T3′) |
| Change | α = 2 β − α + 2a | | | | |
| Fourth<br>(000) | −2ax − bx − by − 2cy +<br>a + b + c − d − e | −bx − 2cy + c − e | 2c<br>(T1′) | 2c + b | 2a + 2c + 2b |
| Change | | β = α − b | | | |
| Fifth<br>(100) | −2ax − bx − by − 2cy +<br>a + b + c − d − e | −2ax − by + a − d | 2a | 2a + b | 2a + 2c + 2b |
| Change | α = 2 β − α + 2c | | | | |
| Sixth<br>(101) | −2ax + by − by + 2cy +<br>a − b + c − d + e | −2ax − by + a − d | 2a | 2a − b<br>(t3′) | 2a + 2c − 2b |
| Change | | β = α − β + b | | | |
| Seventh<br>(001) | −2ax + bx − by + 2cy +<br>a − b + c − d + e | bx + 2cy + c + e | 2c<br>(T1′) | 2c − b | 2a + 2c − 2b<br>(T3′) |
| Change | α = 2 β = α + 2a | | | | |
| Eighth<br>(011) | 2ax + bx + by + 2cy +<br>a + b + c + d + e | bx + 2cy + c + e | 2c<br>(T1′) | 2c + b | 2a + 2c + 2b |
| Change | | β = α − β − b | | | |
| First | 2ax + bx 30 by + 2cy + | 2ax + by + a + d | 2a | 2a + b | 2a + 2c + 2b |

TABLE 1-continued

| Octant | | α | β | T1 | T2 | T3 |
|---|---|---|---|---|---|---|
| (111) | a + b + c + d + e | | | | | |

Now referring to FIG. 1, the preferred embodiment of the invention is described. First, the start point ($X_s$, $Y_s$) is to be given. Then, as shown in the block 2, values for F, α, β, T1, T1′ and b are obtained at the start point and an octant is selected. For example, when drawing a circle $$F=x^2+y^2-36=0,$$

if it is assumed that the start point is (−5, 5) and the initial octant is the first octant, then (by Table 1)

$$F=(-5)^2+5^2-36=14$$

$$\alpha=2x(-5)+2x5+2=2$$

$$\beta=2x(-5)+1=-9$$

$$T1=T1'=2$$

$$b=0$$

are set. And, as shown in the block 4, values for T3, T3′ and T2 are found from the following equations (by Table 1):

$$T3=T1+T1'+2b$$

$$T3'=T1+T1'-2b$$

$$T2=T1(T1')\pm b \text{ (− sign for octants 2, 3, 6 and 7)}$$

For the above example, $$T3=T3'=4$$

$$T2=2.$$

Table 2 below shows α, β, T1 (T1′), T2 and T3 (T3′) in each octant for $F=x^2+y^2-36$.

TABLE 2

| Octant | α | β | T1 (T1′) | T2 | T3 (T3′) |
|---|---|---|---|---|---|
| First (111) | 2x + 2y + 2 | 2x + 1 | 2 | 2 | 4 |
| Second (110) | 2x − 2y + 2 | 2x + 1 | 2 | 2 | 4 |
| Third (010) | 2x − 2y + 2 | −2y + 1 | 2 | 2 | 4 |
| Fourth (000) | −2x − 2y + 2 | −2y + 1 | 2 | 2 | 4 |
| Fifth (100) | −2x − 2y + 2 | −2x + 1 | 2 | 2 | 4 |
| Sixth (101) | −2x + 2y + 2 | −2x + 1 | 2 | 2 | 4 |
| Seventh (001) | −2x + 2y + 2 | 2y + 1 | 2 | 2 | 4 |
| Eighth (011) | 2x + 2y + 2 | 2y + 1 | 2 | 2 | 4 |

Then, as shown in the block 6, the signs for α and β are checked. If α and β have different signs, the octant first selected is a correct octant. In the above example, since α=2, β=−9 and the signs for α and β are different, the octant is the correct one.

Figure 5:
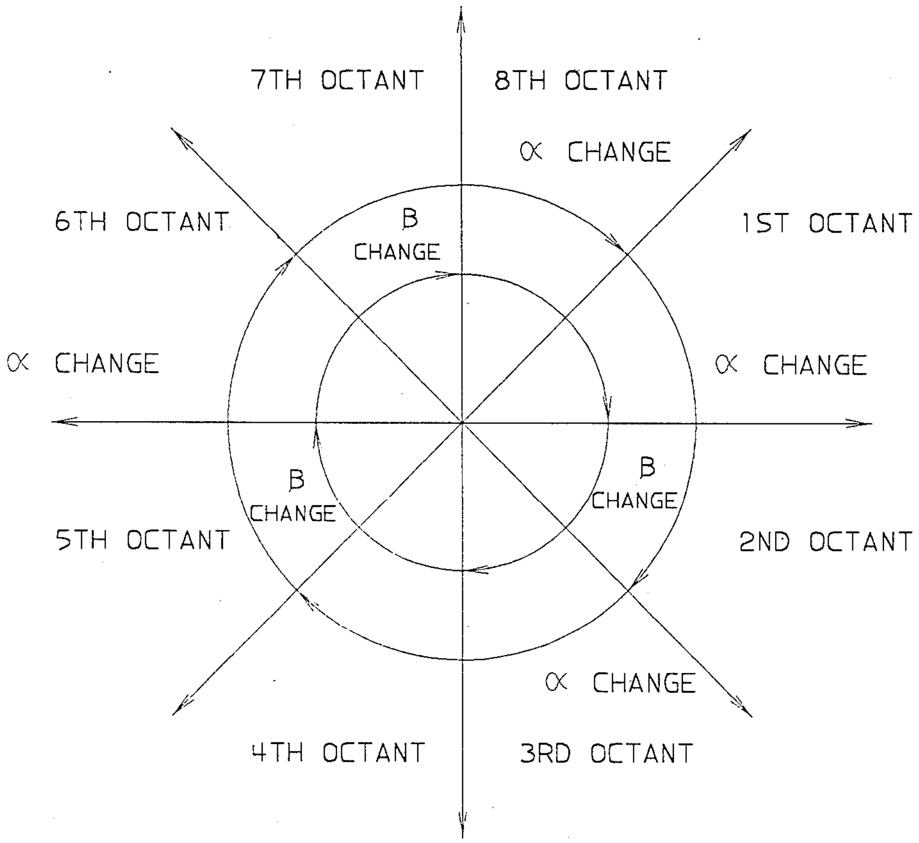
FIG. 5 is a diagram illustrating $\alpha$ and $\beta$ changes accompanying the octant changes.

If α and β have equal signs, the octant change process shown in the block 8 is performed. As clearly seen from Table 1, changing the value of α according to the equations in Table 1 while maintaining β is sufficient to change from the first octant to the second octant, from the third to the fourth, from the fifth to the sixth, or the seventh to the eighth. Also, changing the value of β according to the equations in Table 1 while maintaining α is sufficient to change from the second octant to the third octant, from the fourth to the fifth, from the sixth to the seventh, or the eighth to the first. In particular, when the octant is continuously changed, changes of α and β are caused alternately (see FIG. 5). Then, by checking whether α was changed in the last octant change or not, in the block 10, it is found which one of α and β should now be changed in this octant change. For example, if the current first octant is now to be changed for the second octant, it is found that change of α is now required because β was (or would have been) changed in the last octant change.

If the necessity of change of α is detected, it is decided whether the current octant is the first or fifth octant, or not, in block 12. If so, as shown in the block 14, an operation $$\alpha=2\beta-\alpha+2c$$

is performed to change the value of α. This means that the current octant is changed to the second or the sixth octants, respectively. In the above example, this changes the first octant to the second octant. If in the block 12 it is decided that the current octant is not the first or the fifth octant, it is the third or the seventh octant, so that an operation $$\alpha=2\beta-\alpha+2a$$

is performed in the block 16 to change the value of α. This means that the current octant is changed to the fourth or the eighth octant.

However, when the block 10 provides an affirmative result in judgment, the necessity of change of β is detected, and then, as shown in the block 18, it is judged whether the current octant is the second or sixth octant, or not. If so, as shown in the block 20, an operation $$\beta=\alpha-\beta+b$$

is performed to change β. This means that the current octant is changed to the third or the seventh octant. If the block 18 provides a negative decision, the current octant is the fourth or the eighth octant, so that an operation $$\beta=\alpha-\beta-b$$

is performed to change β, as shown in block 22. This means that the current octant is changed to the fifth or the first octant.

Along with the change of octant as described above, the value of T1 (T1′), T2 and T3 (T3′) are also changed according to Table 1, as briefly indicated in block 24 of FIG. 1. It is clear from Table 1 that new values for all of them corresponding to the new octant can be determined using the values set in the block 2 or 4.

Then, the signs of the new α and β are checked, again in the decision block 6. If α and β have different signs, the point selection process in block 39 is performed. If they still have the same sign, the octant change process in block 8 is again performed. This process continues until α and β have different signs.

When α and β have different signs, it is first judged in the block 32 whether F and α have the same or different signs. It is equivalent to the checking of signs of F and β because, when it is intended to draw a curve in the region of F≧0, F is positive (including zero), so the fact that F and α have the same sign means that α is positive (or zero) and β is negative. When it is intended to draw a curve in the region of F<0, F is negative, so the fact that F and α have the same sign means that α is negative and β is positive (or zero).

If it is judged in block 32 that they have the same sign, the signs of F and F+β are compared, as shown in block 34. If the same sign, the point that displaces by (+1) or (−1) along either X or Y direction is selected, as shown in the block 36. Thus, if it is assumed to be the first octant, (X+1, Y) is selected. If F and F+β are judged in block 34 to have different signs, the point that displaces by (+1) or (−1) in the X direction and (+1) or (−1) in the Y direction is selected, as shown in the block 42. Now, if it is assumed to be the first octant, (X+1, Y+1) is selected.

If F and α are judged in block 32 to have different signs, the signs of F and F+α are compared in the block 40. If the same sign, the point that displaces by (+1) or (−1) in the X direction and (+1) or (−1) in the Y direction is selected as shown in the block 42. If F and F+α are judged to have different signs, the point that displaces by (+1) or (−1) along either X or Y direction is selected, as shown in the block 36.

After the process of block 36 is executed, the values of parameters are updated, as shown in the block 38, according to the equations:

$$F = F + \beta$$

$$\alpha = \alpha + T2$$

$$\beta = \beta + T1\ (T1').$$

After the process of the block 42 is executed, the values of parameters are updated, as shown in the block 44, according to the equations:

$$F = F + \alpha$$

$$\alpha = \alpha + T3\ (T3')$$

$$\beta = \beta + T2.$$

Then, returning to the block 6, the signs of α and β are checked. If they are different, the point selection process of block 30 is again performed. If, however, the signs are the same, the octant change process of block 8 is performed next, as described above.

Figure 6:
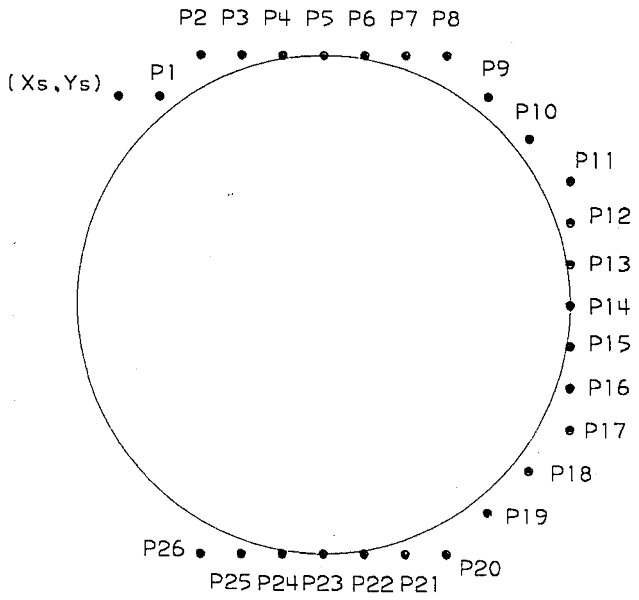
FIG. 6 is a diagram showing a sequence of dots in drawing a circle of $F=x^2+y^2-36=0$ in the region of F≧0 according to the method of FIG. 1.

FIG. 6 shows a circle of $F=x^2+y^2-36=0$ that is drawn in the region of F≧0 according to the method of FIG. 1 by assuming the start point of (−5, 5). Tables 3 and 4 below, taken together as one table, show F, α, β and the octant change when drawing the curve of FIG. 6, also recalling Table 2 above.

TABLE 3

| | F | α | β | Point selection | Next (x, y) |
|---|---|---|---|---|---|
| P1 | 14 | 2 | −9 | (x + 1, y) | (−4, 5) |
| P2 | 5 | 4 | −7 | (x + 1, y + 1) | (−3, 6) |
| | (F + β) | (α + T2) | (β + T1) | | |
| P3 | 9 | 8 | −5 | (x + 1, y) | (−2, 6) |
| | (F + α) | (α + T3) | (β + T2) | | |
| P4 | 4 | 10 | −3 | (x + 1, y) | (−1, 6) |
| | (F + β) | (α + T2) | (β + T1) | | |
| P5 | 1 | 12 | −1 | (x + 1, y) | (0, 6) |
| | (F + β) | (α + T2) | (β + T1) | | |
| | 0 | 14 | 1 | | |
| | (F + β) | (α + T2) | (β + T1) | | |
| P6 (Change of octant) | 0 | −10 (α = 2β − α + 2c) | 1 | (x + 1, y) | (1, 6) |
| P7 | 1 | −8 | 3 | (x + 1, y) | (2, 6) |
| P8 | 4 | −6 | 5 | (x + 1, y) | (3, 6) |
| P9 | 9 | −4 | 7 | (x + 1, y − 1) | (4, 5) |
| | 5 | 0 | 9 | | |
| P10 (Change of octant | 5 | 0 | −9 | (x + 1, y − 1) | (5, 4) |
| P11 | 5 | 4 | −7 | (x + 1, y − 1) | (6, 2) |
| P12 | 9 | 8 | −5 | (x, y − 1) | (6, 2) |
| P13 | 4 | 10 | −3 | (x, y − 1) | (6, 1) |
| P14 | 1 | 12 | −1 | (x, y − 1) | (6, 0) |
| | 0 | −10 | 1 | (x, y − 1) | (6, −1) |
| P15 octant | 0 | −10 | 1 | (x, y − 1) | (6, −1) |

TABLE 4

| | F | α | β | Point selection | Next (x, y) |
|---|---|---|---|---|---|
| P16 | 1 | −8 | 3 | (x, y − 1) | (6, −2) |
| P17 | 4 | −6 | 5 | (x, y − 1) | (6, −3) |
| P18 | 9 | −4 | 7 | (x − 1, y − 1) | (5, −4) |
| | 5 | 0 | 9 | | |
| P19 Change of octant | 5 | 0 | −9 | (x − 1, y − 1) | (4, −5) |
| P20 | 5 | 4 | −7 | (x − 1, y − 1) | (3, −6) |
| P21 | 9 | 8 | −5 | (x − 1, y) | (2, −6) |
| P22 | 4 | 10 | −3 | (x − 1, y) | (1, −6) |
| P23 | 1 | 12 | −1 | (x − 1, y) | (0, −6) |
| | 0 | 14 | 1 | | |
| P24 (Change of | 0 | −10 | 1 | (x − 1, y) | (−1, −6) |

TABLE 4-continued

| | F | α | β | Point selection | Next (x, y) |
|---|---|---|---|---|---|
| octant | | | | | |
| P25 | 1 | −8 | 3 | (x − 1, y) | (−2, −6) |
| P26 | 4 | −6 | 5 | (x − 1, y) | (−3, −6) |

Figure 7:
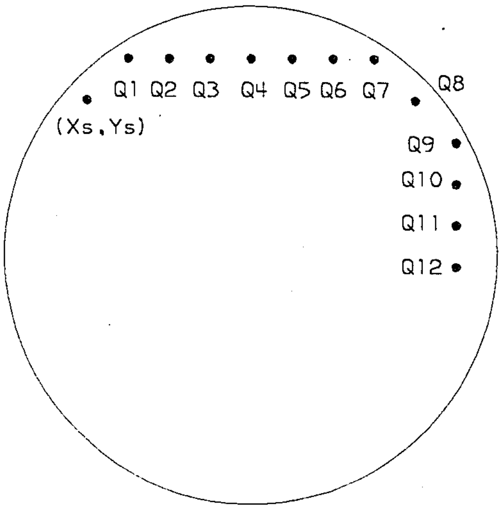
FIG. 7 is a diagram showing a sequence of dots in drawing a circle of $F=x^2+y^2-36=0$ in the region of F<0 according to the method of FIG. 1.
Figure 8A:
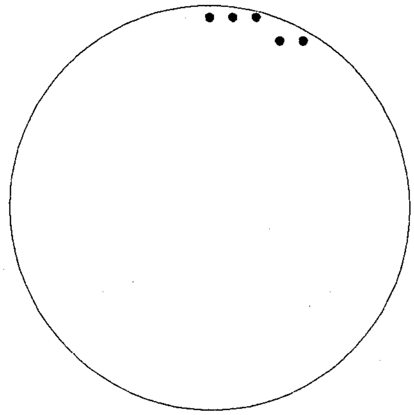
FIGS. 8A, 8B, 8C, 8D, 8E, 8F, 8G and 8H show steps to draw a circle of $F=x^2+y^2-72=0$ in the region of F<0 according to the method of FIG. 1.
Figure 8B:
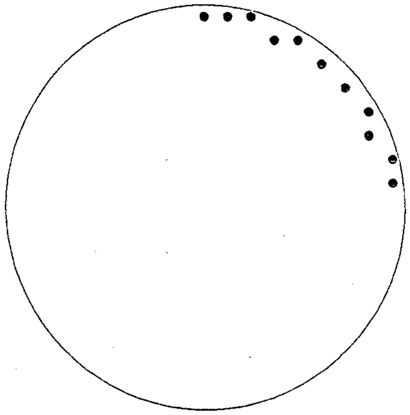
Figure 8C:
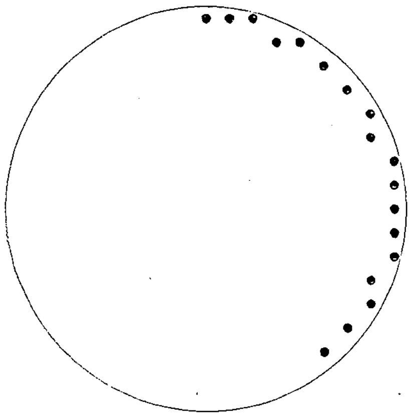
Figure 8D:
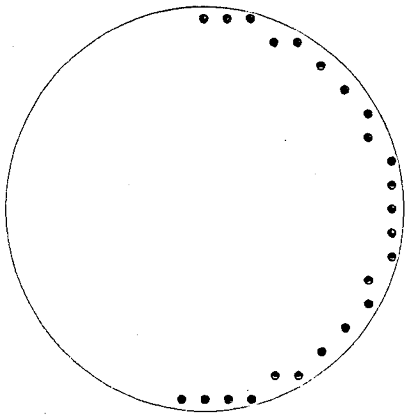
Figure 8E:
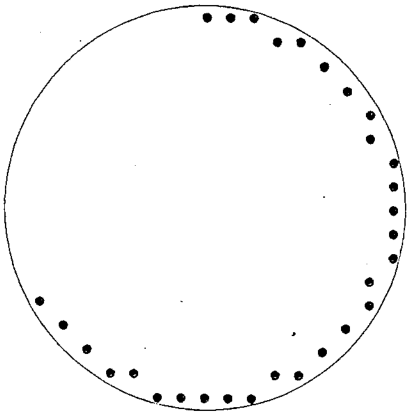
Figure 8F:
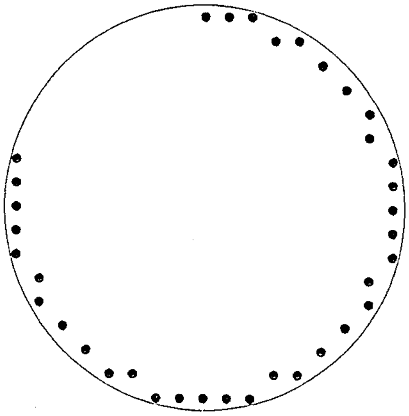
Figure 8G:
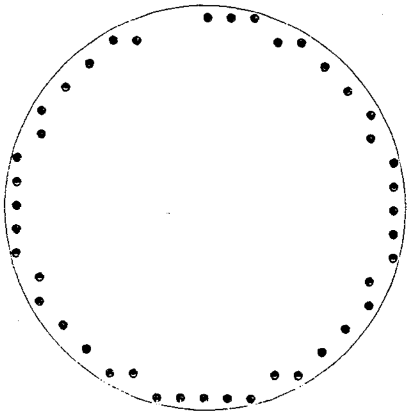
Figure 8H:
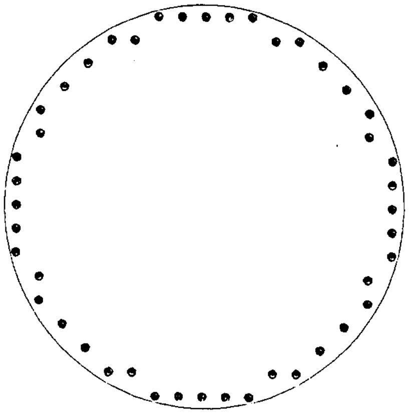
Figure 9A:
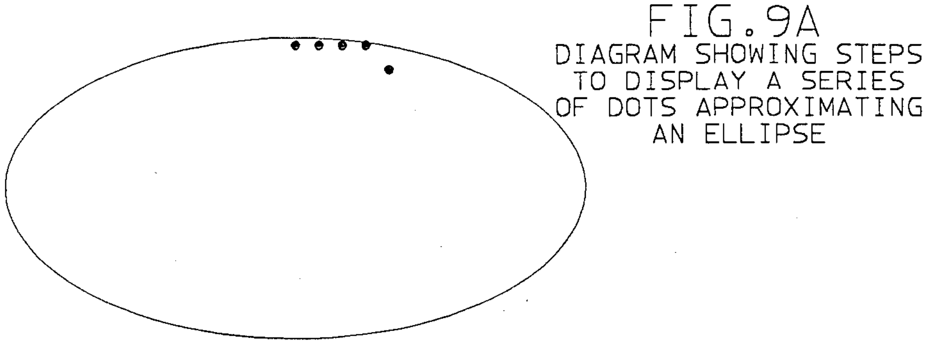
FIGS. 9A, 9B, 9C, 9D, 9E and 9F show steps to draw an ellipse of $F=x^2+4y^2-156=0$ in the region of F<0 according to the method of FIG. 1.
Figure 9B:
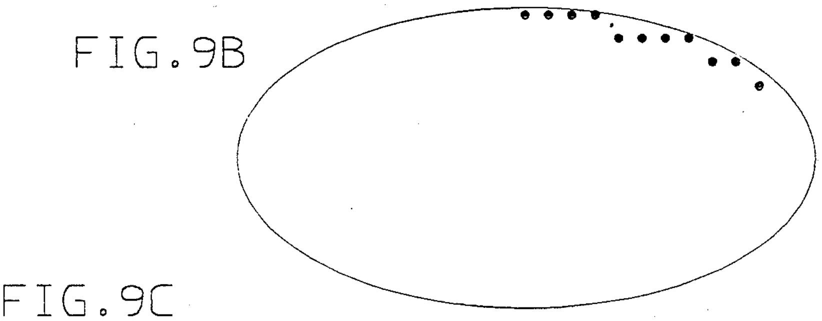
Figure 9C:
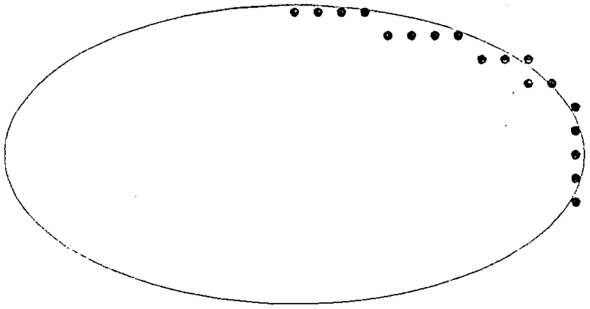
Figure 9D:
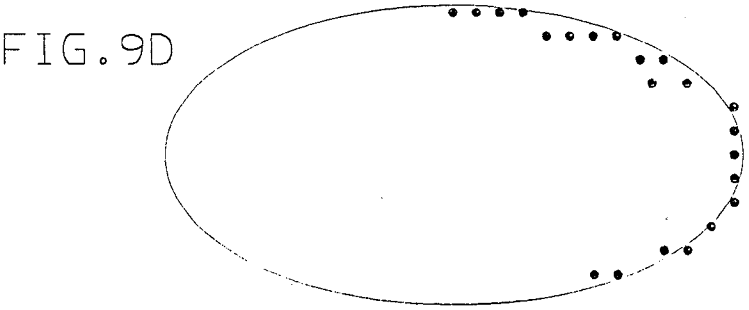
Figure 9E:
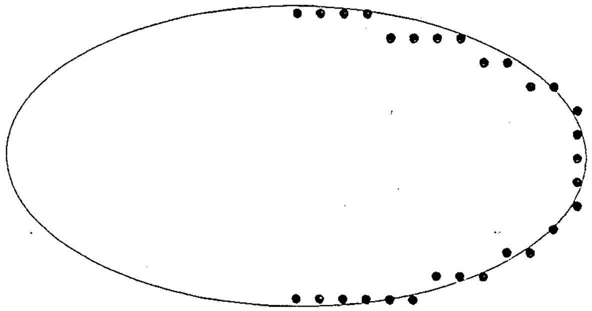
Figure 9F:
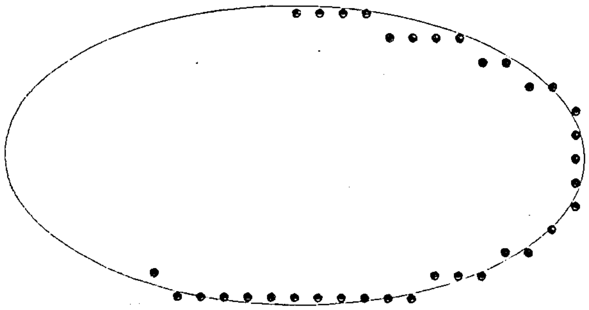
Figure 10A:
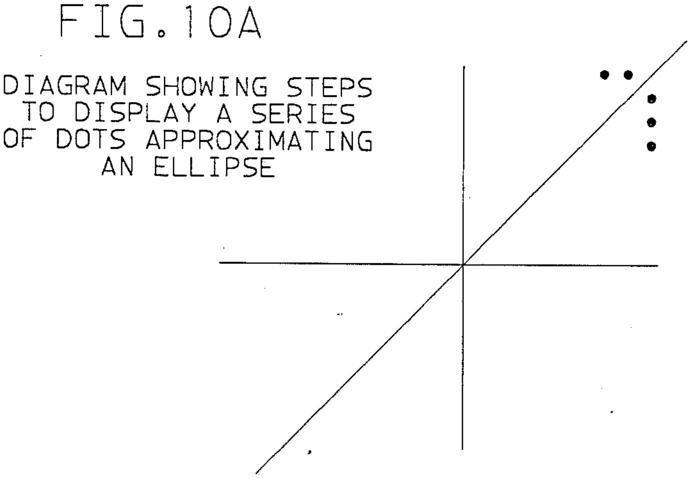
FIGS. 10A, 10B, 10C, 10D, 10E and 10F show steps to draw an ellipse of $F=10x^2-16xy+10y^2-288=0$ in the region of F<0 according to the method of FIG. 1.
Figure 10B:
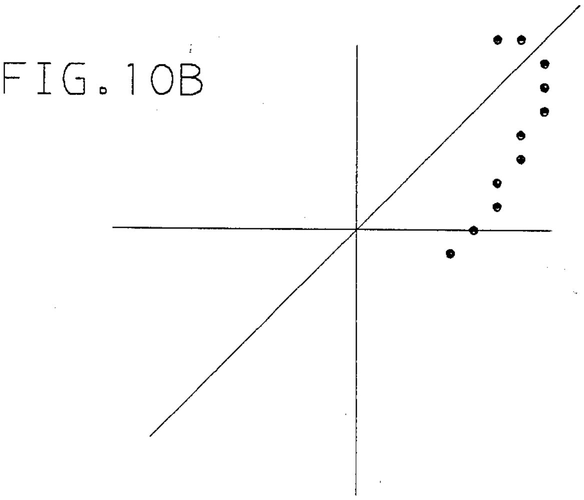
Figure 10C:
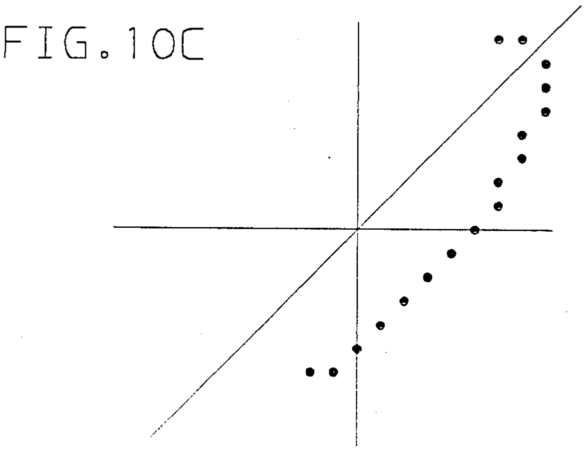
Figure 10D:
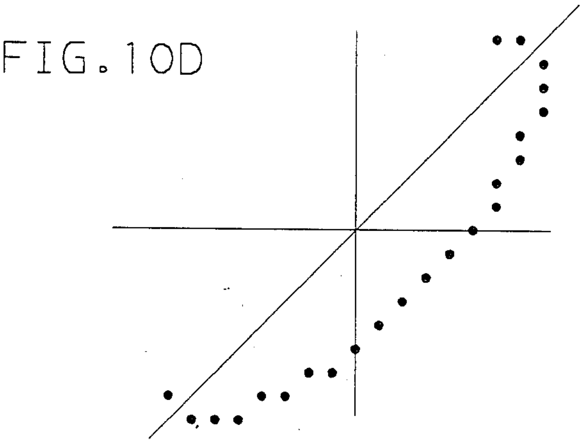
Figure 10E:
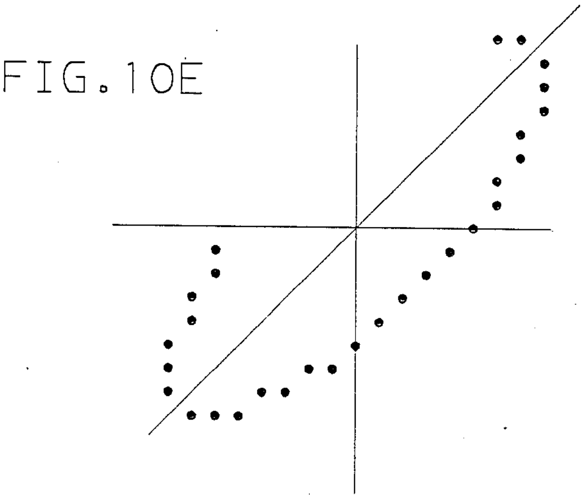
Figure 10F:
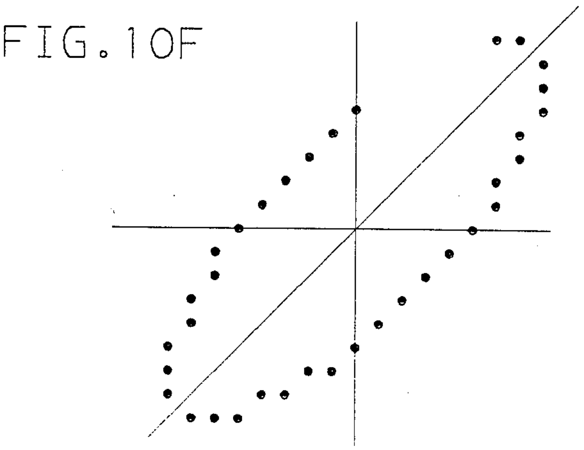
Figure 11A:
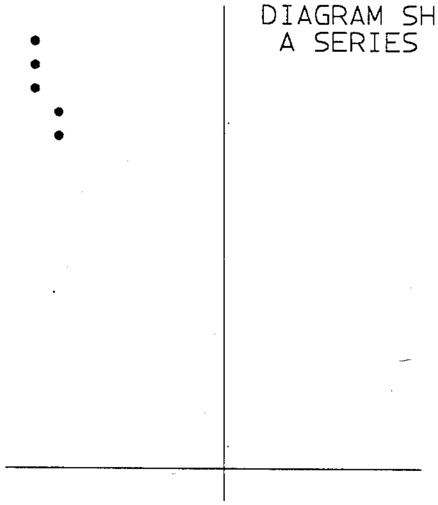
FIGS. 11A, 11B, 11C, 11D, 11E, 11F and 11G show steps to draw a parabola of $F=4y-x^2+2=0$ in the region of F≧0 according to the method of FIG. 1.
Figure 11B:
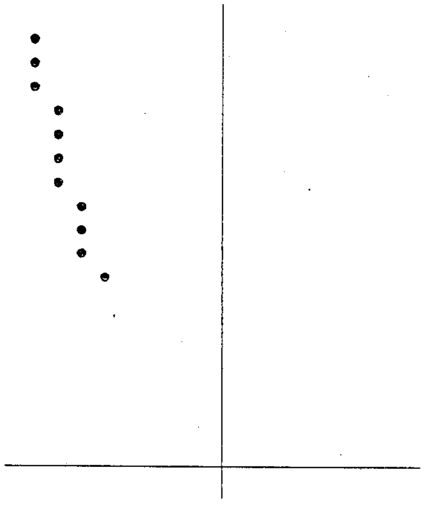
Figure 11C:
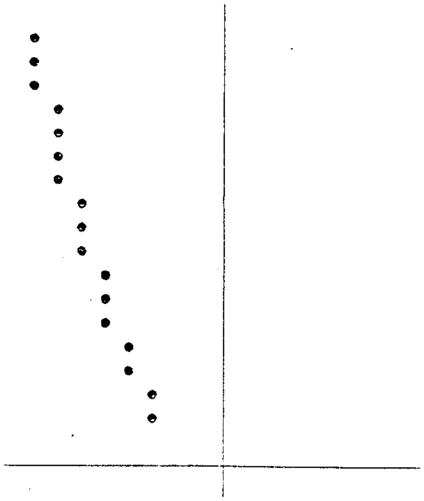
Figure 11D:
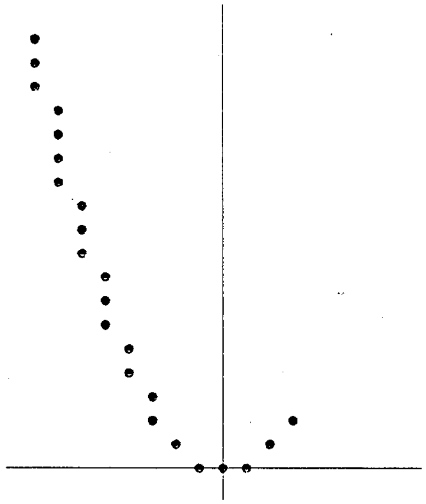
Figure 11E:
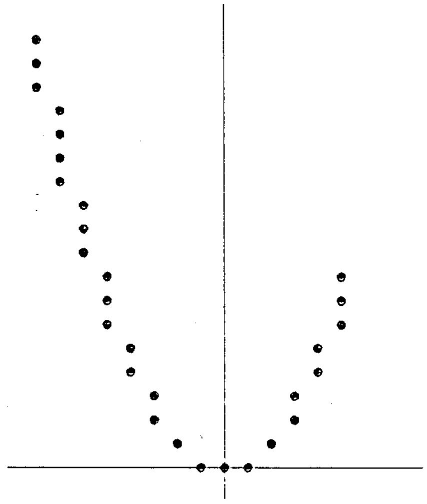
Figure 11F:
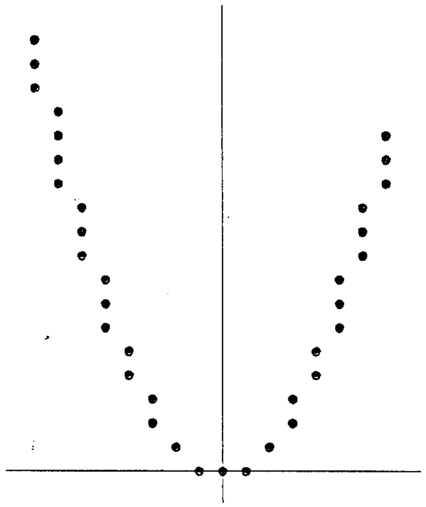
Figure 11G:
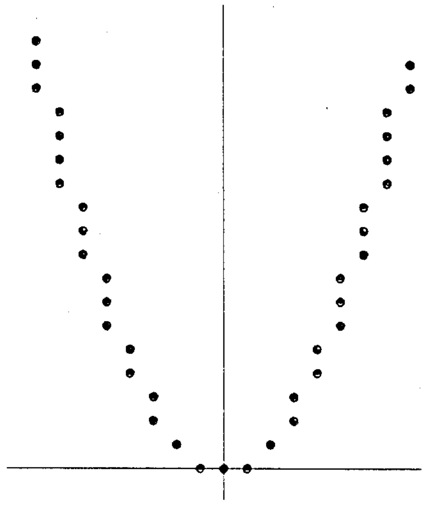

FIG. 7 shows a circle of $F=x^2+y^2-36=0$, which is drawn in the region of F<0 according to the method of FIG. 1 by assuming the start point of (−4, 4). Table 5 below shows F, α, β and the octant change when drawing the curve of FIG. 7, while also recalling Table 2 above.

TABLE 5

| | F | α | β | Point selection | Next (x, y) |
|---|---|---|---|---|---|
| Q1 | −4 | 2 | −7 | (x + 1, y + 1) | (−3, 5) |
| Q2 | −2 | 6 | −5 | (x + 1, y) | (−2, 5) |
| | (F + α) | (α + T3) | (β + T2) | | |
| Q3 | −7 | 8 | −3 | (x + 1, y) | (−1, 5) |
| | (F + β) | (α + T2) | (β + T1) | | |
| Q4 | − 31 10 | 10 | − 1 | (x + 1, y) | (0, 5) |
| | (F + β) | (α + T2) | (β + T1) | | |
| | −11 | 12 | 1 | | |
| | (F + β) | (α + T2) | (β + T1) | | |
| Q5 (Change of octant) | −11 | −8 (2 β − α + 2c) | 1 | (x + 1, y) | (1, 5) |
| Q6 | −10 | −6 | 3 | (x + 1, y) | (2, 5) |
| | (F + β) | (α + T2) | (β + T1) | | |
| Q7 | −7 | −4 | 5 | (x + 1, y) | (3, 5) |
| | (F + β) | (α + T2) | (β + T1) | | |
| Q8 | −2 | −2 | 7 | (x + 1, y − 1) | (4, 4) |
| | (F + β) | (α + T2) | (β + T1) | | |
| | −4 | 2 | 9 | | |
| | (F + α) | (α + T3) | (β + T2) | | |
| Q9 (Change of octant) | −4 | 2 | −7 (α − β + b) | (x + 1, y − 1) | (5, 3) |
| Q10 | −2 | 6 | −5 | (x, y 31 1) | (5, 2) |
| | (F + α) | (α + T3) | (β + T2) | | |
| Q11 | −7 | 8 | −3 | (x, y − 1) | (5, 1) |
| | (F + β) | (α + T2) | (β + T1) | | |
| Q12 | −10 | 10 | −1 | (x, y − 1) | (5, 0) |
| | (F + β) | (α + T2) | (β + T1) | | |

FIGS. 8A, 8B, 8C, 8D, 8E, 8F, 8G and 8H show steps to draw a circle of $F=x^2+y^2-72=0$ in the region of F<0 according to the method of FIG. 1 by assuming the start point of (0, 8). Table 6A, 6B, 6C, 6D, 6E, 6F, 6G and 6H show F, α, β, the octant, T1, T1′, T2, T3 and T3′ corresponding to FIGS. 8A to 8H, respectively.

TABLE 6A

| NO | F | α | β | Octant | T1 | T1′ | T2 | T3 | T3′ |
|---|---|---|---|---|---|---|---|---|---|
| 0 | FFFF8 | FFFF2 | 00001 | 2 | 002 | 002 | 002 | 004 | 004 |
| 1 | FFFF9 | FFFF4 | 00003 | 2 | 002 | 002 | 002 | 004 | 004 |
| 2 | FFFFC | FFFF6 | 00005 | 2 | 002 | 002 | 002 | 004 | 004 |
| 3 | FFFF2 | FFFFA | 00007 | 2 | 002 | 002 | 002 | 004 | 004 |
| 4 | FFFF9 | FFFFC | 00009 | 2 | 002 | 002 | 002 | 004 | 004 |
| 5 | FFFF5 | 00000 | FFFF5 | 3 | 002 | 002 | 002 | 004 | 004 |

TABLE 6B

| NO | F | α | β | Octant | T1 | T1′ | T2 | T3 | T3′ |
|---|---|---|---|---|---|---|---|---|---|
| 6 | FFFF5 | 00004 | FFFF7 | 3 | 002 | 002 | 002 | 004 | 004 |
| 7 | FFFF9 | 00008 | FFFF9 | 3 | 002 | 002 | 002 | 004 | 004 |
| 8 | FFFF2 | 0000A | FFFFB | 3 | 002 | 002 | 002 | 004 | 004 |
| 9 | FFFFC | 0000E | FFFFD | 3 | 002 | 002 | 002 | 004 | 004 |
| 10 | FFFF9 | 00010 | FFFFF | 3 | 002 | 002 | 002 | 004 | 004 |
| 11 | FFFF8 | FFFF2 | 00001 | 4 | 002 | 002 | 002 | 004 | 004 |

TABLE 6C

| NO | F | α | β | Octant | T1 | T1′ | T2 | T3 | T3′ |
|---|---|---|---|---|---|---|---|---|---|
| 12 | FFFF9 | FFFF4 | 00003 | 4 | 002 | 002 | 002 | 004 | 004 |
| 13 | FFFFC | FFFF6 | 00005 | 4 | 002 | 002 | 002 | 004 | 004 |
| 14 | FFFF2 | FFFFA | 00007 | 4 | 002 | 002 | 002 | 004 | 004 |
| 15 | FFFF9 | FFFFC | 00009 | 4 | 002 | 002 | 002 | 004 | 004 |
| 16 | FFFF5 | 00000 | FFFF5 | 5 | 002 | 002 | 002 | 004 | 004 |
| 17 | FFFF5 | 00004 | FFFF7 | 5 | 002 | 002 | 002 | 004 | 004 |

TABLE 6D

| NO | F | α | β | Octant | T1 | T1' | T2 | T3 | T3' |
|---|---|---|---|---|---|---|---|---|---|
| 18 | FFFF9 | 00008 | FFFF9 | 5 | 002 | 002 | 002 | 004 | 004 |
| 19 | FFFF2 | 0000A | FFFFB | 5 | 002 | 002 | 002 | 004 | 004 |
| 20 | FFFFC | 0000E | FFFFD | 5 | 002 | 002 | 002 | 004 | 004 |
| 21 | FFFF9 | 00010 | FFFFF | 5 | 002 | 002 | 002 | 004 | 004 |
| 22 | FFFF8 | FFFF2 | 00001 | 6 | 002 | 002 | 002 | 004 | 004 |
| 23 | FFFF9 | FFFF4 | 00003 | 6 | 002 | 002 | 002 | 004 | 004 |

TABLE 6E

| NO | F | α | β | Octant | T1 | T1' | T2 | T3 | T3' |
|---|---|---|---|---|---|---|---|---|---|
| 24 | FFFFC | FFFF6 | 00005 | 6 | 002 | 002 | 002 | 004 | 004 |
| 25 | FFFF2 | FFFFA | 00007 | 6 | 002 | 002 | 002 | 004 | 004 |
| 26 | FFFF9 | FFFFC | 00009 | 6 | 002 | 002 | 002 | 004 | 004 |
| 27 | FFFF5 | 00000 | FFFF5 | 7 | 002 | 002 | 002 | 004 | 004 |
| 28 | FFFF5 | 00004 | FFFF7 | 7 | 002 | 002 | 002 | 004 | 004 |
| 29 | FFFF9 | 00008 | FFFF9 | 7 | 002 | 002 | 002 | 004 | 004 |

TABLE 6F

| NO | F | α | β | Octant | T1 | T1' | T2 | T3 | T3' |
|---|---|---|---|---|---|---|---|---|---|
| 30 | FFFF2 | 0000A | FFFFB | 7 | 002 | 002 | 002 | 004 | 004 |
| 31 | FFFFC | 0000E | FFFFD | 7 | 002 | 002 | 002 | 004 | 004 |
| 32 | FFFF9 | 00010 | FFFFF | 7 | 002 | 002 | 002 | 004 | 004 |
| 33 | FFFF8 | FFFF2 | 00001 | 8 | 002 | 002 | 002 | 004 | 004 |
| 34 | FFFF9 | FFFF4 | 00003 | 8 | 002 | 002 | 002 | 004 | 004 |
| 35 | FFFFC | FFFF6 | 00005 | 8 | 002 | 002 | 002 | 004 | 004 |

TABLE 6G

| NO | F | α | β | Octant | T1 | T1' | T2 | T3 | T3' |
|---|---|---|---|---|---|---|---|---|---|
| 36 | FFFF2 | FFFFA | 00007 | 8 | 002 | 002 | 002 | 004 | 004 |
| 37 | FFFF9 | FFFFC | 00009 | 8 | 002 | 002 | 002 | 004 | 004 |
| 38 | FFFF5 | 00000 | FFFF5 | 1 | 002 | 002 | 002 | 004 | 004 |
| 39 | FFFF5 | 00004 | FFFF7 | 1 | 002 | 002 | 002 | 004 | 004 |
| 40 | FFFF9 | 00008 | FFFF9 | 1 | 002 | 002 | 002 | 004 | 004 |
| 41 | FFFF2 | 0000A | FFFFB | 1 | 002 | 002 | 002 | 004 | 004 |

TABLE 6H

| NO | F | α | β | Octant | T1 | T1' | T2 | T3 | T3' |
|---|---|---|---|---|---|---|---|---|---|
| 42 | FFFFC | 0000E | FFFFD | 1 | 002 | 002 | 002 | 004 | 004 |
| 43 | FFFF9 | 00010 | FFFFF | 1 | 002 | 002 | 002 | 004 | 004 |
| 44 | FFFF8 | FFFF2 | 00001 | 2 | 002 | 002 | 002 | 004 | 004 |

FIGS. 9A, 9B, 9C, 9D, 9E and 9F show steps to draw an ellipse of $F=x^2+4y^2-156=0$ in the region of $F<0$ according to the method of FIG. 1, by assuming the start point of (0, 6). Table 7A, 7B, 7C, 7D, 7E and 7F show F, α, β, the octant, T1, T1', T2. T3 and T3' corresponding to FIGS. 9A to 9F, respectively.

TABLE 7A

| NO | F | α | β | Octant | T1 | T1' | T2 | T3 | T3' |
|---|---|---|---|---|---|---|---|---|---|
| 0 | FFFF4 | FFFD3 | 00001 | 2 | 002 | 008 | 002 | 00A | 00A |
| 1 | FFFF5 | FFFD5 | 00003 | 2 | 002 | 008 | 002 | 00A | 00A |
| 2 | FFFF8 | FFFD7 | 00005 | 2 | 002 | 008 | 002 | 00A | 00A |
| 3 | FFFFD | FFFD9 | 00007 | 2 | 002 | 008 | 002 | 00A | 00A |
| 4 | FFFD6 | FFFE3 | 00009 | 2 | 002 | 008 | 002 | 00A | 00A |
| 5 | FFFDF | FFFE5 | 0000B | 2 | 002 | 008 | 002 | 00A | 00A |

TABLE 7B

| NO | F | α | β | Octant | T1 | T1' | T2 | T3 | T3' |
|---|---|---|---|---|---|---|---|---|---|
| 6 | FFFEA | FFFE7 | 0000D | 2 | 002 | 008 | 002 | 00A | 00A |
| 7 | FFFF7 | FFFE9 | 0000F | 2 | 002 | 008 | 002 | 00A | 00A |
| 8 | FFFF0 | FFFF3 | 00011 | 2 | 002 | 008 | 002 | 00A | 00A |
| 9 | FFFF1 | FFFF5 | 00013 | 2 | 002 | 008 | 002 | 00A | 00A |
| 10 | FFFF6 | FFFFF | 00015 | 2 | 002 | 008 | 002 | 00A | 00A |
| 11 | FFFFB | 00001 | FFFEA | 3 | 002 | 008 | 008 | 00A | 00A |

TABLE 7C

| NO | F | α | β | Octant | T1 | T1' | T2 | T3 | T3' |
|---|---|---|---|---|---|---|---|---|---|
| 12 | FFFFC | 0000B | FFFF2 | 3 | 002 | 008 | 008 | 00A | 00A |
| 13 | FFFEE | 00013 | FFFFA | 3 | 002 | 008 | 008 | 00A | 00A |
| 14 | FFFE8 | FFFFB | 00002 | 4 | 002 | 008 | 008 | 00A | 00A |
| 15 | FFFEA | FFFF3 | 0000A | 4 | 002 | 008 | 008 | 00A | 00A |
| 16 | FFFF4 | FFFFB | 00012 | 4 | 002 | 008 | 008 | 00A | 00A |
| 17 | FFFEF | 00005 | FFFFB | 5 | 002 | 008 | 002 | 00A | 00A |

TABLE 7D

| NO | F | α | β | Octant | T1 | T1' | T2 | T3 | T3' |
|---|---|---|---|---|---|---|---|---|---|
| 18 | FFFF4 | 0000F | FFFED | 5 | 002 | 008 | 002 | 00A | 00A |
| 19 | FFFE1 | 00011 | FFFEF | 5 | 002 | 008 | 002 | 00A | 00A |
| 20 | FFFF2 | 0001B | FFFF1 | 5 | 002 | 008 | 002 | 00A | 00A |
| 21 | FFFF3 | 0001D | FFFF3 | 5 | 002 | 008 | 002 | 00A | 00A |
| 22 | FFFF6 | 0001F | FFFF5 | 5 | 002 | 008 | 002 | 00A | 00A |
| 23 | FFFF5 | 00029 | FFFF7 | 5 | 002 | 008 | 002 | 00A | 00A |

TABLE 7E

| NO | F | α | β | Octant | T1 | T1' | T2 | T3 | T3' |
|---|---|---|---|---|---|---|---|---|---|
| 24 | FFFEC | 0002B | FFFF9 | 5 | 002 | 008 | 002 | 00A | 00A |
| 25 | FFFE5 | 0002D | FFFFB | 5 | 002 | 008 | 002 | 00A | 00A |
| 26 | FFFE0 | 0002F | FFFFD | 5 | 002 | 008 | 002 | 00A | 00A |
| 27 | FFFDD | 00031 | FFFFF | 5 | 002 | 008 | 002 | 00A | 00A |
| 28 | FFFDC | FFFD7 | 00001 | 6 | 002 | 008 | 002 | 00A | 00A |
| 29 | FFFDD | FFFD9 | 00003 | 6 | 002 | 008 | 002 | 00A | 00A |

TABLE 7F

| NO | F | α | β | Octant | T1 | T1' | T2 | T3 | T3' |
|---|---|---|---|---|---|---|---|---|---|
| 30 | FFFE0 | FFFDB | 00005 | 6 | 002 | 008 | 002 | 00A | 00A |
| 31 | FFFE5 | FFFDD | 00007 | 6 | 002 | 008 | 002 | 00A | 00A |
| 32 | FFFEC | FFFDF | 00009 | 6 | 002 | 008 | 002 | 00A | 00A |
| 33 | FFFF5 | FFFE1 | 0000B | 6 | 002 | 008 | 002 | 00A | 00A |
| 34 | FFFD6 | FFFEB | 0000D | 6 | 002 | 008 | 002 | 00A | 00A |
| 35 | FFFE3 | FFFED | 0000F | 6 | 002 | 008 | 002 | 00A | 00A |

FIGS. 10A, 10B, 10C, 10D, 10E and 10F show steps to draw an ellipse of $F=10x^2-16xy+10y^2-288=0$ in the region of $F<0$ according to the method of FIG. 1, by assuming the start print of (6, 8). Table 8A, 8B, 8C, 8D, 8E and 8F show F, α, β, the octant, T1, T1', T2, T3 and T3' corresponding to FIGS. 10A to 10F, respectively.

TABLE 8A

| NO | F | α | β | Octant | T1 | T1' | T2 | T3 | T3' |
|---|---|---|---|---|---|---|---|---|---|
| 0 | FFFC8 | FFFDC | 00002 | 2 | 014 | 014 | 024 | 008 | 048 |
| 1 | FFFCA | 00000 | FFFDA | 3 | 014 | 014 | 024 | 008 | 048 |
| 2 | FFFCA | 00048 | FFFFE | 3 | 014 | 014 | 024 | 008 | 048 |
| 3 | FFFC8 | FFFCC | 00012 | 4 | 014 | 014 | 004 | 008 | 048 |
| 4 | FFFDA | FFFD0 | 00026 | 4 | 014 | 014 | 004 | 008 | 048 |
| 5 | FFFAA | FFFD8 | 0002A | 4 | 014 | 014 | 004 | 008 | 048 |

TABLE 8B

| NO | F | α | β | Octant | T1 | T1' | T2 | T3 | T3' |
|---|---|---|---|---|---|---|---|---|---|
| 6 | FFFD4 | FFFDC | 0003E | 4 | 014 | 014 | 004 | 008 | 048 |
| 7 | FFFB0 | FFFE4 | 00042 | 4 | 014 | 014 | 004 | 008 | 048 |
| 8 | FFFF2 | FFFE8 | 00056 | 4 | 014 | 014 | 004 | 008 | 048 |
| 9 | FFFDA | FFFF0 | 0005A | 4 | 014 | 014 | 004 | 008 | 048 |
| 10 | FFFCA | FFFF8 | 0005E | 4 | 014 | 014 | 004 | 008 | 048 |
| 11 | FFFC2 | 00000 | FFFAE | 5 | 014 | 014 | 004 | 008 | 048 |

TABLE 8C

| NO | F | α | β | Octant | T1 | T1' | T2 | T3 | T3' |
|---|---|---|---|---|---|---|---|---|---|
| 12 | FFFC2 | 00008 | FFFB2 | 5 | 014 | 014 | 004 | 008 | 048 |
| 13 | FFFCA | 00010 | FFFB6 | 5 | 014 | 014 | 004 | 008 | 048 |
| 14 | FFFDA | 00018 | FFFBA | 5 | 014 | 014 | 004 | 008 | 048 |
| 15 | FFFF2 | 00020 | FFFBE | 5 | 014 | 014 | 004 | 008 | 048 |
| 16 | FFFB0 | 00024 | FFFD2 | 5 | 014 | 014 | 004 | 008 | 048 |
| 17 | FFFD4 | 0002C | FFFD6 | 5 | 014 | 014 | 004 | 008 | 048 |

TABLE 8D

| O | F | α | β | Octant | T1 | T1' | T2 | T3 | T3' |
|---|---|---|---|---|---|---|---|---|---|
| 18 | FFFAA | 00030 | FFFEA | 5 | 014 | 014 | 004 | 008 | 048 |
| 19 | FFFDA | 00038 | FFFEE | 5 | 014 | 014 | 004 | 008 | 048 |
| 20 | FFFC8 | FFFDC | 00002 | 6 | 014 | 014 | 024 | 008 | 048 |
| 21 | FFFCA | 00000 | FFFDA | 7 | 014 | 014 | 024 | 008 | 048 |
| 22 | FFFCA | 00048 | FFFFE | 7 | 014 | 014 | 024 | 008 | 048 |
| 23 | FFFCB | FFFCC | 00012 | 8 | 014 | 014 | 004 | 008 | 048 |

TABLE 8E

| NO | F | α | β | Octant | T1 | T1' | T2 | T3 | T3' |
|---|---|---|---|---|---|---|---|---|---|
| 24 | FFFDA | FFFD0 | 00026 | 8 | 014 | 014 | 004 | 008 | 048 |
| 25 | FFFAA | FFFD8 | 0003A | 8 | 014 | 014 | 004 | 008 | 048 |
| 26 | FFFD4 | FFFDC | 0003E | 8 | 014 | 014 | 004 | 008 | 048 |
| 27 | FFFB0 | FFFE4 | 00042 | 8 | 014 | 014 | 004 | 008 | 048 |
| 28 | FFFF2 | FFFE8 | 00056 | 8 | 014 | 014 | 004 | 008 | 048 |
| 29 | FFFDA | FFFF0 | 0005A | 8 | 014 | 014 | 004 | 008 | 048 |

TABLE 8F

| NO | F | α | β | Octant | T1 | T1' | T2 | T3 | T3' |
|---|---|---|---|---|---|---|---|---|---|
| 30 | FFFCA | FFFF8 | 0005E | 8 | 014 | 014 | 004 | 008 | 048 |
| 31 | FFFC2 | 00000 | FFFAE | 1 | 014 | 014 | 004 | 008 | 048 |
| 32 | FFFC2 | 00008 | FFFB2 | 1 | 014 | 014 | 004 | 008 | 048 |
| 33 | FFFCA | 00010 | FFFB6 | 1 | 014 | 014 | 004 | 008 | 048 |
| 34 | FFFDA | 00018 | FFFBA | 1 | 014 | 014 | 004 | 008 | 048 |
| 35 | FFFF2 | 00020 | FFFBE | 1 | 014 | 014 | 004 | 008 | 048 |

FIGS. 11A, 11B, 11C, 11D, 11E, 11F and 11G show steps to draw a parabola of $F=4y-x^2+2=0$ in the region of F≧0 according to the method of FIG. 1, by assuming the start point of (−8, 18). Table 9A, 9B, 9C, 9D, 9E, 9F and 9G show F, α, β, the octant, T1, T1', T2, T3 and T3' corresponding to FIGS. 11A to 11G, respectively.

TABLE 9A

| NO | F | α | β | Octant | T1 | T1' | T2 | T3 | T3' |
|---|---|---|---|---|---|---|---|---|---|
| 0 | 0000A | 0000B | FFFFC | 3 | FFE | 000 | 000 | FFE | FFE |
| 1 | 00006 | 0000B | FFFFC | 3 | FFE | 000 | 000 | FFE | FFE |
| 2 | 00002 | 0000B | FFFFC | 3 | FFE | 000 | 000 | FFE | FFE |
| 3 | 0000D | 00009 | FFFFC | 3 | FFE | 000 | 000 | FFE | FFE |
| 4 | 00009 | 00009 | FFFFC | 3 | FFE | 000 | 000 | FFE | FFE |
| 5 | 00005 | 00009 | FFFFC | 3 | FFE | 000 | 000 | FFE | FFE |

TABLE 9B

| NO | F | α | β | Octant | T1 | T1' | T2 | T3 | T3' |
|---|---|---|---|---|---|---|---|---|---|
| 6 | 00001 | 00009 | FFFFC | 3 | FFE | 000 | 000 | FFE | FFE |
| 7 | 0000A | 00007 | FFFFC | 3 | FFE | 000 | 000 | FFE | FFE |
| 8 | 00006 | 00007 | FFFFC | 3 | FFE | 000 | 000 | FFE | FFE |
| 9 | 00002 | 00007 | FFFFC | 3 | FFE | 000 | 000 | FFE | FFE |
| 10 | 00009 | 00005 | FFFFC | 3 | FFE | 000 | 000 | FFE | FFE |
| 11 | 00005 | 00005 | FFFFC | 3 | FFE | 000 | 000 | FFE | FFE |

TABLE 9C

| NO | F | α | β | Octant | T1 | T1' | T2 | T3 | T3' |
|---|---|---|---|---|---|---|---|---|---|
| 12 | 00001 | 00005 | FFFFC | 3 | FFE | 000 | 000 | FFE | FFE |
| 13 | 00006 | 00003 | FFFFC | 3 | FFE | 000 | 000 | FFE | FFE |
| 14 | 00002 | 00003 | FFFFC | 3 | FFE | 000 | 000 | FFE | FFE |
| 15 | 00005 | 00001 | FFFFC | 3 | FFE | 000 | 000 | FFE | FFE |
| 16 | 00001 | 00001 | FFFFC | 3 | FFE | 000 | 000 | FFE | FFE |
| 17 | 00002 | FFFFF | 00003 | 2 | FFE | 000 | FFE | FFE | FFE |

TABLE 9D

| NO | F | α | β | Octant | T1 | T1' | T2 | T3 | T3' |
|---|---|---|---|---|---|---|---|---|---|
| 18 | 00001 | FFFFD | 00001 | 2 | FFE | 000 | FFE | FFE | FFE |
| 19 | 00002 | 00003 | FFFFF | 1 | FFE | 000 | FFE | FFE | FFE |
| 20 | 00001 | 00001 | FFFFD | 1 | FFE | 000 | FFE | FFE | FFE |
| 21 | 00002 | FFFFF | 00004 | 8 | FFE | 000 | 000 | FFE | FFE |
| 22 | 00001 | FFFFD | 00004 | 8 | FFE | 000 | 000 | FFE | FFE |
| 23 | 00005 | FFFFD | 00004 | 8 | FFE | 000 | 000 | FFE | FFE |

TABLE 9E

| NO | F | α | β | Octant | T1 | T1' | T2 | T3 | T3' |
|---|---|---|---|---|---|---|---|---|---|
| 24 | 00002 | FFFFB | 00004 | 8 | FFE | 000 | 000 | FFE | FFE |
| 25 | 00006 | FFFFB | 00004 | 8 | FFE | 000 | 000 | FFE | FFE |
| 26 | 00001 | FFFF9 | 00004 | 8 | FFE | 000 | 000 | FFE | FFE |
| 27 | 00005 | FFFF9 | 00004 | 8 | FFE | 000 | 000 | FFE | FFE |
| 28 | 00009 | FFFF9 | 00004 | 8 | FFE | 000 | 000 | FFE | FFE |
| 29 | 00002 | FFFF7 | 00004 | 8 | FFE | 000 | 000 | FFE | FFE |

TABLE 9F

| NO | F | α | β | Octant | T1 | T1' | T2 | T3 | T3' |
|---|---|---|---|---|---|---|---|---|---|
| 30 | 00006 | FFFF7 | 00004 | 8 | FFE | 000 | 000 | FFE | FFE |
| 31 | 0000A | FFFF7 | 00004 | 8 | FFE | 000 | 000 | FFE | FFE |
| 32 | 00001 | FFFF5 | 00004 | 8 | FFE | 000 | 000 | FFE | FFE |
| 33 | 00005 | FFFF5 | 00004 | 8 | FFE | 000 | 000 | FFE | FFE |
| 34 | 00009 | FFFF5 | 00004 | 8 | FFE | 000 | 000 | FFE | FFE |
| 35 | 0000D | FFFF5 | 00004 | 8 | FFE | 000 | 000 | FFE | FFE |

TABLE 9G

| NO | F | α | β | Octant | T1 | T1' | T2 | T3 | T3' |
|---|---|---|---|---|---|---|---|---|---|
| 36 | 00002 | FFFF3 | 00004 | 8 | FFE | 000 | 000 | FFE | FFE |
| 37 | 00006 | FFFF3 | 00004 | 8 | FFE | 000 | 000 | FFE | FFE |
| 38 | 0000A | FFFF3 | 00004 | 8 | FFE | 000 | 000 | FFE | FFE |
| 39 | 0000E | FFFF3 | 00004 | 8 | FFE | 000 | 000 | FFE | FFE |
| 40 | 00001 | FFFF3 | 00004 | 8 | FFE | 000 | 000 | FFE | FFE |
| 41 | 00005 | FFFF3 | 00004 | 8 | FFE | 000 | 000 | FFE | FFE |

FIG. 12 shows a configuration of an apparatus used for implementing the method of FIG. 1. First, the parameters F, α, β, T1, T1' and b representing a curve to be drawn as well as the octant are given through a data bus 50 and a multiplexer 52. The parameters F, α, β, T1, T1' and b are stored in an F register 60, α register 54, β register 56, T1 register 62, T1' register 64 and b register 58, respectively. The octant is provided to an octant section 74. A pair of start coordinates ($X_S$, $Y_S$) is set in an X counter 84 and a Y counter 86, respectively.

Then, an adder control circuit 78 receives an instruction to perform operation according to the following equations through the data bus 50 and the multiplexer 52:

$$T3=T1+T1'+2b$$

$$T3'=T1+T1'-2b$$

$$T2=T1(T1')\pm b$$

According to the instruction, an adder 80 performs the above operations using output from the T1, T1' and b registers 62, 64 and 58, respectively, and supplies the results to T3, T3' and T2 registers 68, 70 and 66, respectively.

Then, a first sign judging section 72 receives outputs from the α and β registers 54 and 56 and compares the signs of α and β. The first sign judging section 72 supplies an octant change request signal to the octant section 74 through a line 73 if the signs of α and β are the same The octant section 74 also receives through a line 75 a signal indicating whether change of α was performed in the last octant change or not. However, it is unknown whether α was changed in the last octant change when the octant is first provided. So a signal indicating whether change of α should be assumed in the last octant change or not is supplied at the same time when an octant is provided from outside.

When the octant section 74 receives a signal indicating that a change of α was (or would have been) performed in an octant preceding to the given octant, it causes the adder 80 to perform an operation $$\beta=\alpha-\beta+b$$

through the adder control circuit 78 if the given octant is the second, third, sixth or seventh octant, and supplies the result to the β register 56. The octant section 74 causes the adder 80 to perform an operation $$\beta=\alpha-\beta-b$$

through the adder control circuit 78 if the given octant is the first fourth, fifth or eighth octant, and supplies the result of the β register 56.

If the section 74 receives a signal indicating that the change of α was not performed in an octant preceding to the given octant, it causes the adder 80 to perform an operation $$\alpha=2\beta-\alpha+2c$$

through the adder control circuit 78 if the given octant is the first, second, fifth or sixth octant, and supplies the result to the α register 54. if the given octant is the third, fourth, seventh or eighth octant, it causes the adder 80 to perform an operation $$\alpha=2\beta-\alpha+2a,$$

and supplies the result to the α register 54. Also, it causes the adder 80 to perform an operation of $T2=T1(T1')\pm b$. The octant section 74 generates a code representing the new octant which becomes the current octant after the change.

If the signs of α and β become different after the octant change, the first sign judging section 72 does not issue the octant change request signal any more. Then, the second sign judging section 76 receives the outputs of the α register 54 and the F register 60 and checks the signs of F and α. If they are the same, the section 76 instructs the adder control circuit 78 to perform an operation to generate F+$\beta$. According to this, the adder 80 receives the outputs of the F and $\beta$ registers 60 and 56, performs the operation (F+$\beta$), and supplies the result to a step control circuit 82, through the multiplexer 52.

The step control circuit 82 is also supplied with the output of the F register 60, and a signal representing the current octant from the octant section 74. The step control circuit 82 generates output as listed in Table 10 below.

TABLE 10

| Octant | Signs for F and F + $\beta$ | X up | X down | Y up | Y down |
|---|---|---|---|---|---|
| First | Same | on | off | off | off |
| | Different | on | off | on | off |
| Second | Same | on | off | off | off |
| | Different | on | off | off | on |
| Third | Same | off | off | off | on |
| | Different | on | off | off | on |
| Fourth | Same | off | off | off | on |
| | Different | off | on | off | on |
| Fifth | Same | off | on | off | off |
| | Different | off | on | off | on |
| Sixth | Same | off | on | off | off |
| | Different | off | on | on | off |
| Seventh | Same | off | off | on | off |
| | Different | off | on | on | off |
| Eighth | Same | off | off | on | off |
| | Different | on | off | on | off |

If the second sign judging circuit 76 detects that the signs of F and $\alpha$ are different, it instructs the adder circuit 78 to perform an operation to generate F+$\alpha$. The adder 80 receives the outputs of the F and $\alpha$ registers 60 and 54, performs the operation (F+$\alpha$), and supplies the result to the step control circuit 82. In this case, the step control circuit 82 generates as listed in Table 11.

TABLE 11

| Octant | Signs for F and F + $\alpha$ | X up | X down | Y up | Y down |
|---|---|---|---|---|---|
| First | Same | on | off | on | off |
| | Different | on | off | off | off |
| Second | Same | on | off | off | on |
| | Different | on | off | off | off |
| Third | Same | on | off | off | on |
| | Different | off | off | off | on |
| Fourth | Same | off | on | off | on |
| | Different | off | off | off | on |
| Fifth | Same | off | on | off | off |
| | Different | off | on | off | off |
| Sixth | Same | off | on | on | off |
| | Different | off | on | off | off |
| Seventh | Same | off | on | on | off |
| | Different | off | off | on | off |
| Eighth | Same | on | off | on | off |
| | Different | off | off | on | off |

The X and Y counters 84 and 86, respectively, increase or decrease the values of X and Y by one according to output supplied from the step control circuit 82. The output of the step control circuit 82 is also supplied to the adder control circuit 78. When the step control circuit 82 outputs a signal to increment only one of either X or Y by ±1, the adder control circuit 78 causes the adder 80 to perform the following operations to update the values of F, $\alpha$ and $\beta$.

$$F=F+\beta$$

$$\alpha=\alpha+T2$$

$$\beta=\beta+T1\ (T1')$$

When the step control circuit 82 outputs signals to increment both X and Y by ±1, the adder control circuit 78 causes the adder 80 to perform the following operations to update the values of F, $\alpha$ and $\beta$.

$$F=F+\alpha$$

$$\alpha=\alpha+T3(T3')$$

$$\beta=\beta+T2$$

Thereafter, the next point will be obtained using the new parameters. When the values of the X and Y counters 84 and 86 reach the end point coordinates set in X and Y end point registers 88 and 90, respectively, drawing of the curve is terminated by signals from a stop check circuit 92.

Since the above embodiment changes the octant by noticing the signs of $\alpha$ and $\beta$, the change of octant can be continuously performed until the signs of $\alpha$ and $\beta$ become different, and, therefore, a sharp curve in which a plurality of octant changes are continuously occurring can easily be drawn.

In addition, double lines that never cross with each other can easily be drawn by first drawing a line approximate to F (x, y)=0 in a region of F≧0, and then drawing a line approximate to F=0 in the region of F<0.

As seen from the foregoing description, the invention reduces the number of parameters, simplifies the operation, and makes realization in hardware easy by selecting a new point close to F (x, y)=0 in only one of either region of F (x, y)≧0 or F (x, y)<0 for generating signals representing F (x, y)=0.

What is claimed is:

1. A method for generating signals representing a line approximate to a quadratic curve $$F(x, y)=ax^2+bxy+cy^2+dx+ey+f=0$$

by repeating a step selecting a new point close to $F(x, y)=0$ from among eight points (x+1, y+1), (x+1, y), (x+1, y−1), (x, y−1), (x−1, y−1), (x−1, y), (x−1, y+1) and (x, y+1) adjacent to a current point (x, y) in a Cartesian coordinates system, characterized in that said step selecting one of said eight points consists of a step selecting a new point close to F (x, y)=0 in only one of either the region of F (x, y)≧0 or the region F (x, y)<0, said step selecting a new point close to F (x, y)=0 comprising:

an octant selecting step selecting one octant from among the first octant in which point (x+1, y+1) or (x+1, y) can be selected, the second octant in which point (x+1, y) or (x+1, y−1) can be selected, the third octant in which point (x+1, y−1) or (x, y−1) can be selected, the fourth octant in which point (x, y−1) or (x−1, y−1) can be selected, the fifth octant in which point (x−1, y−1) or (x−1, y) can be selected, the sixth octant in which point (x−1, y) or (x−1, y+1) can be selected, the seventh octant in which point (x−1, y+1) or (x, y+1) can be selected, the eighth octant in which point (x, y+1) or (x+1, y+1) can be selected, and selecting a point close to $F(x, y)=0$ in either one region of F (x, y)≧0 or F (x, y)<0 from two selectable points in the octant selected by said octant selecting step.

2. A method for generating quadratic curve signals as claimed in claim 1, wherein said octant selecting step selects an octant having $\alpha$ and $\beta$ values with different signs, when assuming that $\alpha$ and $\beta$ are:

in the first octant,
$\alpha = F(x+1, y+1) - F(x, y)$
$\beta = F(x+1, y) - F(x, y)$
in the second octant,
$\alpha = F(x+1, y-1) - F(x, y)$
$\beta = F(x+1, y) - F(x, y)$
in the third octant,
$\alpha = F(x+1, y-1) - F(x, y)$
$\beta = F(x, y-1) - F(x, y)$
in the fourth octant,
$\alpha = F(x-1, y-1) - F(x, y)$
$\beta = F(x, y-1) - F(x, y)$
in the fifth octant,
$\alpha = F(x-1, y-1) - F(x, y)$
$\beta = F(x-1, y) - F(x, y)$
in the sixth octant,
$\alpha = F(x-1, y+1) - F(x, y)$
$\beta = F(x-1, y) - F(x, y)$
in the seventh octant,
$\alpha = F(x-1, y+1) - F(x, y)$
$\beta = F(x, y+1) - F(x, y)$, and
in the eighth octant,
$\alpha = F(x+1, y+1) - F(x, y)$
$\beta = F(x, y+1) - F(x, y)$.

3. A method for generating quadratic curve signals as claim in claim 2, wherein said point selecting step includes the steps of:

(a) comparing the sign of F (x, y) with that of $\alpha$ at the point (x, y),
(b) comparing the sign of F (x, y) with that of F (x, y)+$\beta$ when the signs of F (x, y) and $\alpha$ are the same in the comparison of step (a),
(c) comparing the sign of F (x, y) with that of F (x, y)+$\alpha$ when the signs of F (x, y) and $\alpha$ are different in the comparison of step (a),
(d) selecting a point that displaces by (+1) or (−1) in the X direction and by (+1) or (−1) in the Y direction from the point (x, y) when the signs are judged to be the same in the step (b), or when the signs are judged to be different in the step (c), and
(e) selecting a point that displaces by (+1) or (−1) in the X direction and by (+1) or (−1) in the Y direction from the point (x, y) when the signs are judged to be different in the step (b), or when the signs are judged to be the same in the step (c).

4. A method for generating quadratic curve signals as claimed in claim 2, wherein, when F (x, y)≧0, said point selecting step includes the steps of:

(f) checking the sign of $\alpha$ or $\beta$,
(G) checking the sign of F (x, y)+$\beta$ when it is judged that the sign of $\alpha$ is positive, or that the sign of $\beta$ is negative in the step (f),
(h) checking the sign of F (x, y)+$\alpha$ when the sign of $\alpha$ is judged to be negative, or the sign of $\beta$ is judged to be positive in the step (f),
(i) selecting a point that displaces by (+1) or (−1) in the X direction and by (+1) or (−1) in the Y direction from the point (x, y), when the sign of F (x, y)+$\beta$ is judged to be positive in the step (g), or when the sign of F (x, y)+$\alpha$ is judged to be negative in the step (h), and
(j) selecting a point that displaces by (+1) or (−1) in X direction and by (+1) or (−1) in Y direction from the point (x, y), when the sign of F (x, y)+$\beta$ is judged to be negative in the step (h).

5. A method for generating quadratic curve signals as claimed in claim 2, wherein, when F (x, y)<0, said point selecting step includes the steps of:

(k) checking the sign of $\alpha$ or $\beta$,
(l) checking the sign of F (x, y)+$\alpha$ when it is judged that the sign of $\alpha$ is positive, or that the sign of $\beta$ is negative in the step (k),
(m) checking the sign of F (x, y)+$\beta$ when the sign of $\alpha$ is judged to be negative, or the sign of $\beta$ is judged to be positive in the step (k),
(n) selecting a point that displaces by (+1) or (−1) in the X direction and by (+1) or (−1) in the Y direction from the point (x, y), when the sign of F (x, y)+$\alpha$ is judged to be positive in the step (l), or when the sign of F (x, y)+$\beta$ is judged to be negative in the step (m), and
(o) selecting a point that displaces by (+1) or (−1) in the X direction and by (+1) or (−1) in the Y direction from the point (x, y), when the sign of F (x, y)+$\alpha$ is judged to be negative in the step (l), or when the sign of F (x, y)+$\beta$ is judged to be positive in the step (m).

6. A method for generating quadratic curve signals as claimed in claim 3, 4 or 5, wherein said point selecting step further comprises the steps of:

(p) updating the values of F (x, y), $\alpha$ and $\beta$ after selecting a point which displaces by (+1) or (−1) in the X direction and by (+1) or (−1) in the Y direction from the point (x, y), according to the following equations:

$$F(x,y) = F(x, y) + \beta$$

$$\alpha = \alpha + T2$$

$$\beta = \beta + T1$$

wherein, T1 is:
in the first and second octant, 2a (=β(x+1, y)−β(x, y)),
in the third and fourth octant, 2c(=β(x, y−1)−β(x, y)),
in the fifth and sixth octant, 2a(=β(x−1, y)−β(x, y)),
in the seventh and eighth octant, 2c(=β(x, y+1)−β(x, y)), and
T2 is:
in the first octant, 2a+b(=α(x+1, y)−α(x, y))
in the second octant, 2a−b(=α(x'1, y)−α(x, y))
in the third octant, 2c−b(=α(x, y−1)−α(x, y))
in the fourth octant, 2c+b(=α(x, y−1)−α(x, y))
in the fifth octant, 2a+b(=α(x−1, y)−α(x, y)),
in the sixth octant, 2a−b(=α(x−1, y)−α(x, y)),
in the seventh octant, 2c−b(=α(x, y+1)−α(x, y)), and
in the eighth octant, 2c+b(=α(x, y+1)−α(x, y)), and (q) updating the values of F (x, y), $\alpha$ and $\beta$ after selecting a point that displaces by (+1) or (−1) in the X direction and by (+1) or (−1) in the Y direction from the point (x, y), according to the following equations:

$$F(x,y) = F(x, y) + \alpha$$

$\alpha = \alpha + T3$ $\beta = \beta + T2$ wherein, T2 is:

in the first octant, $2a + b (= \beta(x+1, y+1) - \beta(x, y))$, in the second octant, $2a - b (= \beta(x+1, y-1) - \beta(x, y))$, in the third octant, $2c + b (= \beta(x+1, y-1) - \beta(x, y))$, in the fourth octant, $2c + b (= \beta(x-1, y-1) - \beta(x, y))$, in the fifth octant, $2a + b (= \beta(x-1, y+1) - \beta(x, y))$, in the sixth octant, $2a - b (= \beta(x-1, y+1) - \beta(x, y))$, in the seventh octant, $2c - b (= \beta(x-1, y+1) - \beta(x, y))$, and in the eighth octant, $2c + b (= \beta(x+1, y+1) - \beta(x, y))$; and T3 is:

in the first octant, $2a + 2c + 2b (= \alpha(x+1, y+1) - \alpha(x, y))$ in the second octant and third octant, $2a + 2c - 2b (= \alpha(x+1, y-1) - \alpha(x, y))$, in the fourth and fifth octant, $2a + 2c + 2b (= \alpha(x-1, y-1) - \alpha(x, y))$ in the sixth and seventh octant, $2a + 2c - 2b (= \alpha(x-1, y+1) - \alpha(x, y))$, and in the eighth octant, $2a + 2c + 2b (= \alpha(x+1, y+1) - \alpha(x, y))$.

7. A method for generating quadratic curve signals as claimed in claim 6, wherein said method further comprises the steps of:

(r) checking the signs of $\alpha$ and $\beta$ updated in said step (p) or (q), (s) changing the octant to an octant in which the signs of $\alpha$ and $\beta$ are different when the signs of $\alpha$ and $\beta$ are judged to be the same in said step (r).

* * * * *